US012707320B2

(12) United States Patent
Shehata et al.

(10) Patent No.: US 12,707,320 B2
(45) Date of Patent: Aug. 11, 2026

(54) CHANNEL PRIORITIZATION (CP) ADAPTATION

(71) Applicant: QUALCOMM Incorporated, San Diego, CA (US)

(72) Inventors: Mohamed Atef Abdelazim Shehata, Lannion (FR); Chih-Ping Li, San Diego, CA (US); Mickael Mondet, Louannec (FR); Prashanth Haridas Hande, San Diego, CA (US); Linhai He, San Diego, CA (US); Peerapol Tinnakornsrisuphap, San Diego, CA (US); Ravi Agarwal, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 18/092,839

(22) Filed: Jan. 3, 2023

(65) Prior Publication Data

US 2024/0224110 A1 Jul. 4, 2024

(51) Int. Cl.

*H04W 28/02* (2009.01)
*H04L 47/24* (2022.01)
*H04W 72/566* (2023.01)

(52) U.S. Cl.

CPC ..... *H04W 28/0268* (2013.01); *H04L 47/2458* (2013.01); *H04W 72/569* (2023.01)

(58) Field of Classification Search

CPC . H04W 72/569; H04W 72/23; H04W 72/535; H04W 28/0268; H04L 47/2458

See application file for complete search history.

(56) References Cited

U.S. PATENT DOCUMENTS

| | | | | |
|---|---|---|---|---|
| 2020/0059925 | A1* | 2/2020 | Lee | H04W 28/0278 |
| 2021/0007003 | A1 | 1/2021 | Wu | |
| 2021/0058328 | A1 | 2/2021 | Xu et al. | |
| 2021/0153065 | A1 | 5/2021 | Adjakple et al. | |
| 2022/0053362 | A1 | 2/2022 | Sebire et al. | |
| 2022/0132603 | A1 | 4/2022 | Adjakple et al. | |

(Continued)

OTHER PUBLICATIONS

Garcia et al "A Tutorial on 5G NR V2X Communications", 2021 IEEE (Year: 2021).*

(Continued)

*Primary Examiner* — Omer S Mian

(74) *Attorney, Agent, or Firm* — Holland & Hart LLP

(57) ABSTRACT

Some wireless communications systems may support logical channel prioritization (LCP) adaptation. A user equipment (UE) may receive signaling scheduling multiple data flows associated with a set of channels in particular logical channels, where each data flow of the multiple data flows is associated with a set of one or more parameters. The UE may calculate a deadline metric (DM) associated with a transmission time of each data flow based on the sets of one or more channel prioritization parameters and may adapt the set of one or more parameters associated one or more data flows of the multiple data flows based at least in part on the DM. The UE may transmit a first data flow of the multiple data flows based at least in part on a prioritization of the first data flow over a second data flow, the prioritization based at least in part on the adapting.

30 Claims, 16 Drawing Sheets

(56) References Cited

U.S. PATENT DOCUMENTS

| | | | | |
|---|---|---|---|---|
| 2022/0158776 | A1 | 5/2022 | Kang et al. | |
| 2022/0174687 | A1* | 6/2022 | Kuo | H04W 72/535 |
| 2024/0064560 | A1* | 2/2024 | Konda | H04W 28/0278 |
| 2025/0267656 | A1* | 8/2025 | Yang | H04W 72/0453 |

OTHER PUBLICATIONS

Baek et al, "De-prioritization Impact of LCH-based Prioritization for Industrial Internet of Things in 3GPP NR", IEEE 2022 (Year: 2022).*

International Search Report and Written Opinion—PCT/US2023/081882—ISA/EPO—Mar. 14, 2024.

* cited by examiner

700

1100

Figure 15:
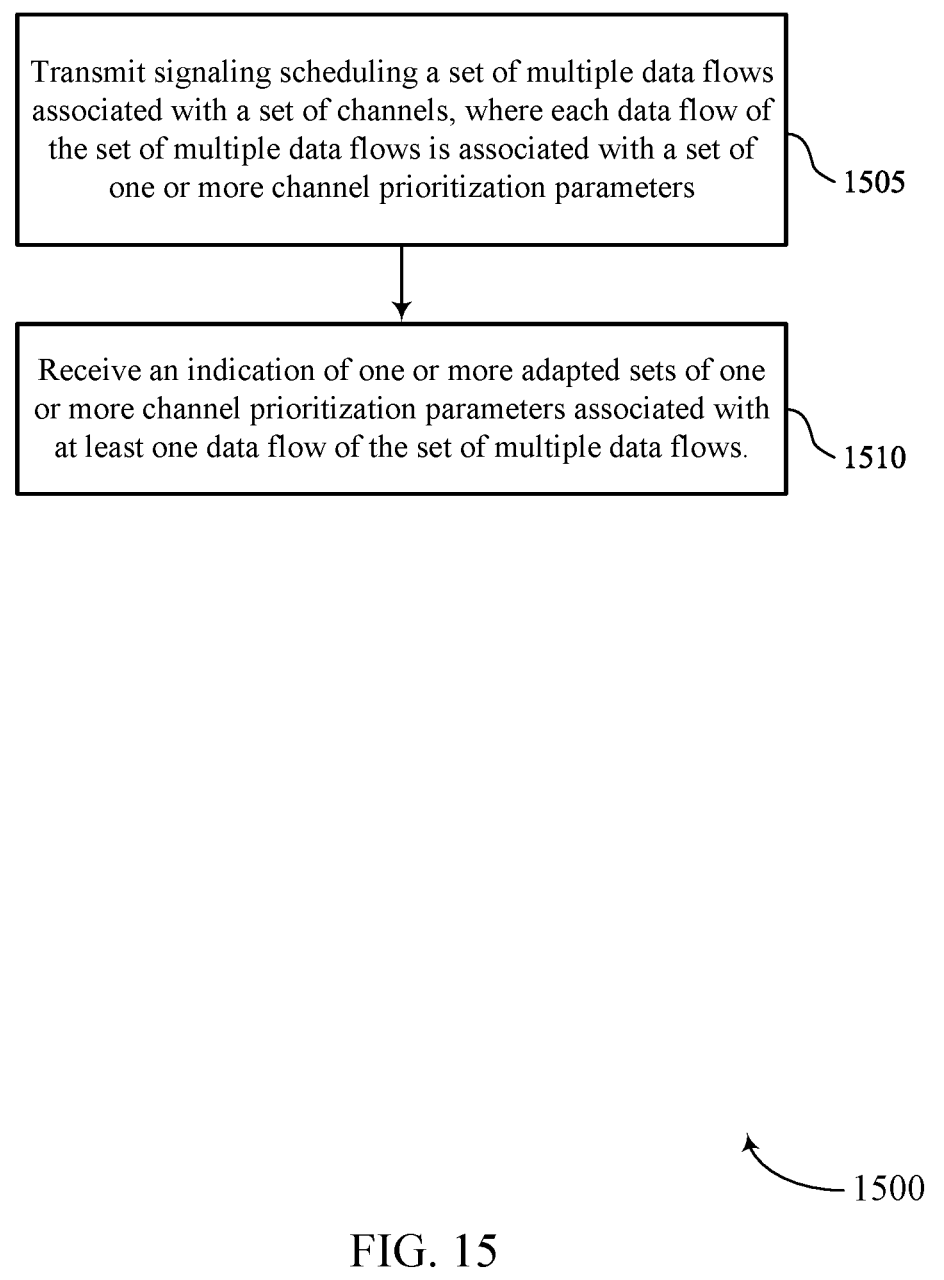

Transmit signaling scheduling a set of multiple data flows associated with a set of channels, where each data flow of the set of multiple data flows is associated with a set of one or more channel prioritization parameters

1505

Receive an indication of one or more adapted sets of one or more channel prioritization parameters associated with at least one data flow of the set of multiple data flows.

CHANNEL PRIORITIZATION (CP) ADAPTATION

FIELD OF TECHNOLOGY

The following relates to wireless communications, including channel prioritization (CP) adaptation, in particular logical channel prioritization (LCP) adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support channel prioritization (CP) adaptation, in particular logical channel prioritization (LCP) adaptation. Generally, the techniques described herein may enable a user equipment (UE) to adapt one or more parameters (e.g., CP parameters), in particular LCP parameters, associated with at least one data flow from a set of data flows, such that the UE may perform a CP procedure, in particular an LCP procedure, based on the one or more adapted CP parameters. For example, a UE may receive signaling scheduling multiple data flows associated with a set of channels. Each data flow of the multiple data flows may be associated with a set of one or more CP parameters. The UE may calculate a deadline metric (DM) associated with a transmission time of each data flow based on the sets of one or more CP parameters and may adapt the set of one or more CP parameters associated with at least one data flow of the multiple data flows based on the DM. In some examples, each DM may be based on a packet delay budget (PDB), a throughput, a payload size, a quantity of bits, or any combination thereof, associated with each data flow. For example, the UE may calculate a time duration to flush a buffer associated with each data flow based on the throughput and quantity of bits, where the DM is based on the time duration to flush the buffer.

Accordingly, the UE may transmit a first data flow of the multiple data flows based on a prioritization of the first data flow over a second data flow of the multiple data flows, where the prioritization is based on the adapting. In some examples, the first data flow may arrive at a buffer associated with the UE before or at a same time that the second data flow arrives at the buffer associated with the UE. In such cases, the UE may transmit the first data flow and transmit the second data flow after completing transmission of the first data flow. Conversely, the first data flow may arrive at the buffer associated with the UE after the second data flow arrives at the buffer associated with the UE. In such cases, the UE may pause transmission of the second data flow to transmit the first data flow, resuming transmission of the second data flow after completing transmission of the first data flow.

A method for wireless communications at a UE is described. The method may include receiving signaling scheduling a set of multiple data flows associated with a set of channels, where each data flow of the set of multiple data flows is associated with a set of one or more CP parameters, calculating a DM associated with a transmission time of each data flow based at least in part on the sets of one or more CP parameters, adapting the set of one or more CP parameters associated with at least one data flow of the set of multiple data flows based on the DM, and transmitting a first data flow of the set of multiple data flows based on a prioritization of the first data flow over a second data flow of the set of multiple data flows, where the prioritization is based on the adapting.

An apparatus for wireless communications at a UE is described. The apparatus may include a processor, memory coupled with the processor, and instructions stored in the memory. The instructions may be executable by the processor to cause the apparatus to receive signaling scheduling a set of multiple data flows associated with a set of channels, where each data flow of the set of multiple data flows is associated with a set of one or more CP parameters, calculate a DM associated with a transmission time of each data flow based at least in part on the sets of one or more CP parameters, adapt the set of one or more CP parameters associated with at least one data flow of the set of multiple data flows based on the DM, and transmit a first data flow of the set of multiple data flows based on a prioritization of the first data flow over a second data flow of the set of multiple data flows, where the prioritization is based on the adapting.

Another apparatus for wireless communications at a UE is described. The apparatus may include means for receiving signaling scheduling a set of multiple data flows associated with a set of channels, where each data flow of the set of multiple data flows is associated with a set of one or more CP parameters, means for calculating a DM associated with a transmission time of each data flow based at least in part on the sets of one or more CP parameters, means for adapting the set of one or more CP parameters associated with at least one data flow of the set of multiple data flows based on the DM, and means for transmitting a first data flow of the set of multiple data flows based on a prioritization of the first data flow over a second data flow of the set of multiple data flows, where the prioritization is based on the adapting.

A non-transitory computer-readable medium storing code for wireless communications at a UE is described. The code may include instructions executable by a processor to receive signaling scheduling a set of multiple data flows associated with a set of channels, where each data flow of the set of multiple data flows is associated with a set of one or more CP parameters, calculate a DM associated with a transmission time of each data flow based on the sets of one or more CP parameters, adapt the set of one or more CP parameters associated with at least one data flow of the set of multiple data flows based on the DM, and transmit a first data flow of the set of multiple data flows based on a prioritization of the first data flow over a second data flow of the set of multiple data flows, where the prioritization is based on the adapting.

In some examples of the method, apparatuses, and non-transitory computer-readable medium described herein, calculating the DM associated with the transmission time of each data flow may include operations, features, means, or instructions for calculating the DM associated with the transmission time of each data flow based on a PDB, a throughput, a payload size, a quantity of bits, or any combination thereof.

In some examples of the method, apparatuses, and non-transitory computer-readable medium described herein, calculating the DM associated with the transmission time of each data flow may include operations, features, means, or instructions for calculating a time duration to flush a buffer associated with each data flow based on the throughput and the quantity of bits, where the DM associated with the transmission time of each data flow may be based on the time duration to flush the buffer.

In some examples of the method, apparatuses, and non-transitory computer-readable medium described herein, calculating the DM associated with the transmission time of each data flow may include operations, features, means, or instructions for calculating the DM based on a first scaling parameter associated with PDB, the PDB, a second scaling parameter associated with throughput, and the throughput.

In some examples of the method, apparatuses, and non-transitory computer-readable medium described herein, calculating the DM associated with the transmission time of each data flow may include operations, features, means, or instructions for calculating the DM as a weighted sum of reciprocals of the packet delay budget and the throughput, wherein the weighted sum is based on the first scaling parameter associated with the PDB and the second scaling parameter associated with throughput.

In some examples of the method, apparatuses, and non-transitory computer-readable medium described herein, the first data flow arrives at a buffer associated with the UE before or at a same time that the second data flow arrives at the buffer associated with the UE and the method, apparatuses, and non-transitory computer-readable medium may include further operations, features, means, or instructions for transmitting the second data flow of the set of multiple data flows after completing transmission of the first data flow of the set of multiple data flows.

In some examples of the method, apparatuses, and non-transitory computer-readable medium described herein, the first data flow arrives at a buffer associated with the UE after the second data flow arrives at the buffer associated with the UE and the method, apparatuses, and non-transitory computer-readable medium may include further operations, features, means, or instructions for transmitting a first portion of the second data flow of the set of multiple data flows and transmitting a second portion of the second data flow of the set of multiple data flows after completing transmission of the first data flow of the set of multiple data flows.

In some examples of the method, apparatuses, and non-transitory computer-readable medium described herein, adapting the set of one or more CP parameters associated with the at least one data flow of the set of multiple data flows may include operations, features, means, or instructions for adapting a priority associated with each data flow of the at least one data flow based at least in part on the respective DM associated with each data flow of the at least one data flow, where the set of one or more CP parameters includes the priority.

In some examples of the method, apparatuses, and non-transitory computer-readable medium described herein, adapting the priority associated with the at least one data flow of the set of multiple data flows may include operations, features, means, or instructions for adapting a priority of the first data flow to be higher than a priority of the second data flow based on the DM associated with the first data flow being higher than the DM associated with the second data flow, where prioritizing the first data flow over the second data flow may be based on the priority of the first data flow being higher than the priority of the second data flow.

Some examples of the method, apparatuses, and non-transitory computer-readable medium described herein may further include operations, features, means, or instructions for receiving signaling indicating the set of one or more CP parameters associated with each data flow of the set of multiple data flows.

In some examples of the method, apparatuses, and non-transitory computer-readable medium described herein, the set of one or more CP parameters associated with each data flow of the set of multiple data flows includes one or more scaling parameters associated with one or more quality of service (QOS) parameters, including at least a first scaling parameter associated with PDB and a second scaling parameter associated with throughput.

Some examples of the method, apparatuses, and non-transitory computer-readable medium described herein may further include operations, features, means, or instructions for receiving signaling indicating a set of multiple candidate sets of one or more CP parameters associated with each data flow of the set of multiple data flows, where adapting the set of one or more CP parameters associated with the at least one data flow of the set of multiple data flows includes selecting the set of one or more logical channels CP parameters from the set of multiple candidate sets of one or more CP parameters.

Some examples of the method, apparatuses, and non-transitory computer-readable medium described herein may further include operations, features, means, or instructions for transmitting an indication of the adapted set of one or more CP parameters associated with the at least one data flow of the set of multiple data flows.

In some examples of the method, apparatuses, and non-transitory computer-readable medium described herein, the set of one or more CP parameters includes a priority, a prioritized bit rate (PBR), a bucket size duration (BSD), or any combination thereof.

Some examples of the method, apparatuses, and non-transitory computer-readable medium described herein may further include operations, features, means, or instructions for receiving an indication of a packet error rate (PER) associated with each data flow of the set of multiple data flows, where calculating the DM associated with the transmission time of each data flow may be based on the respective PER.

A method for wireless communications at a network entity is described. The method may include transmitting signaling scheduling a set of multiple data flows associated with a set of logical channels, where each data flow of the set of multiple data flows is associated with a set of one or more CP parameters and receiving an indication of one or more adapted sets of one or more CP parameters associated with at least one data flow of the set of multiple data flows.

An apparatus for wireless communications at a network entity is described. The apparatus may include a processor, memory coupled with the processor, and instructions stored in the memory. The instructions may be executable by the processor to cause the apparatus to transmit signaling scheduling a set of multiple data flows associated with a set of logical channels, where each data flow of the set of multiple data flows is associated with a set of one or more CP parameters and receive an indication of one or more adapted sets of one or more CP parameters associated with at least one data flow of the set of multiple data flows.

Another apparatus for wireless communications at a network entity is described. The apparatus may include means for transmitting signaling scheduling a set of multiple data flows associated with a set of logical channels, where each data flow of the set of multiple data flows is associated with a set of one or more CP parameters and means for receiving an indication of one or more adapted sets of one or more CP parameters associated with at least one data flow of the set of multiple data flows.

A non-transitory computer-readable medium storing code for wireless communications at a network entity is described. The code may include instructions executable by a processor to transmit signaling scheduling a set of multiple data flows associated with a set of logical channels, where each data flow of the set of multiple data flows is associated with a set of one or more CP parameters and receive an indication of one or more adapted sets of one or more CP parameters associated with at least one data flow of the set of multiple data flows.

Some examples of the method, apparatuses, and non-transitory computer-readable medium described herein may further include operations, features, means, or instructions for transmitting signaling indicating the set of one or more CP parameters associated with each data flow of the set of multiple data flows for triggering a UE to adapt the sets of one or more channel prioritization parameters based at least in part on a DM associated with a transmission time of each data flow.

In some examples of the method, apparatuses, and non-transitory computer-readable medium described herein, the set of one or more CP parameters associated with each data flow of the set of multiple data flows includes one or more scaling parameters associated with one or more QoS parameters, including at least a first scaling parameter associated with PDB and a second scaling parameter associated with throughput.

Some examples of the method, apparatuses, and non-transitory computer-readable medium described herein may further include operations, features, means, or instructions for transmitting signaling indicating a set of multiple candidate sets of one or more CP parameters associated with each data flow of the set of multiple data flows, where the set of multiple candidate sets of CP parameters associated with the at least one data flow of the set of multiple data flows flow includes the one or more adapted sets of one or more CP parameters associated with the at least one data flow of the set of multiple data flows.

In some examples of the method, apparatuses, and non-transitory computer-readable medium described herein, the set of one or more CP parameters includes a priority, a PBR, a BSD, or any combination thereof.

Some examples of the method, apparatuses, and non-transitory computer-readable medium described herein may further include operations, features, means, or instructions for transmitting an indication of a PER associated with each data flow of the set of multiple data flows, where the DM associated with the transmission time of each data flow may be based on the respective PER.

The explanations regarding the respective non-transitory computer-readable media storing code for wireless communication likewise apply to respective computer programs. A computer program is disclosed, comprising instructions that, when executed on a processor, cause the processor to perform the method of one of the aspects mentioned above.

BRIEF DESCRIPTION OF THE DRAWINGS

FIGS. 13 through 15 illustrate flowcharts showing methods that support LCP adaptation in accordance with one or more aspects of the present disclosure.

DETAILED DESCRIPTION

Figure 1:
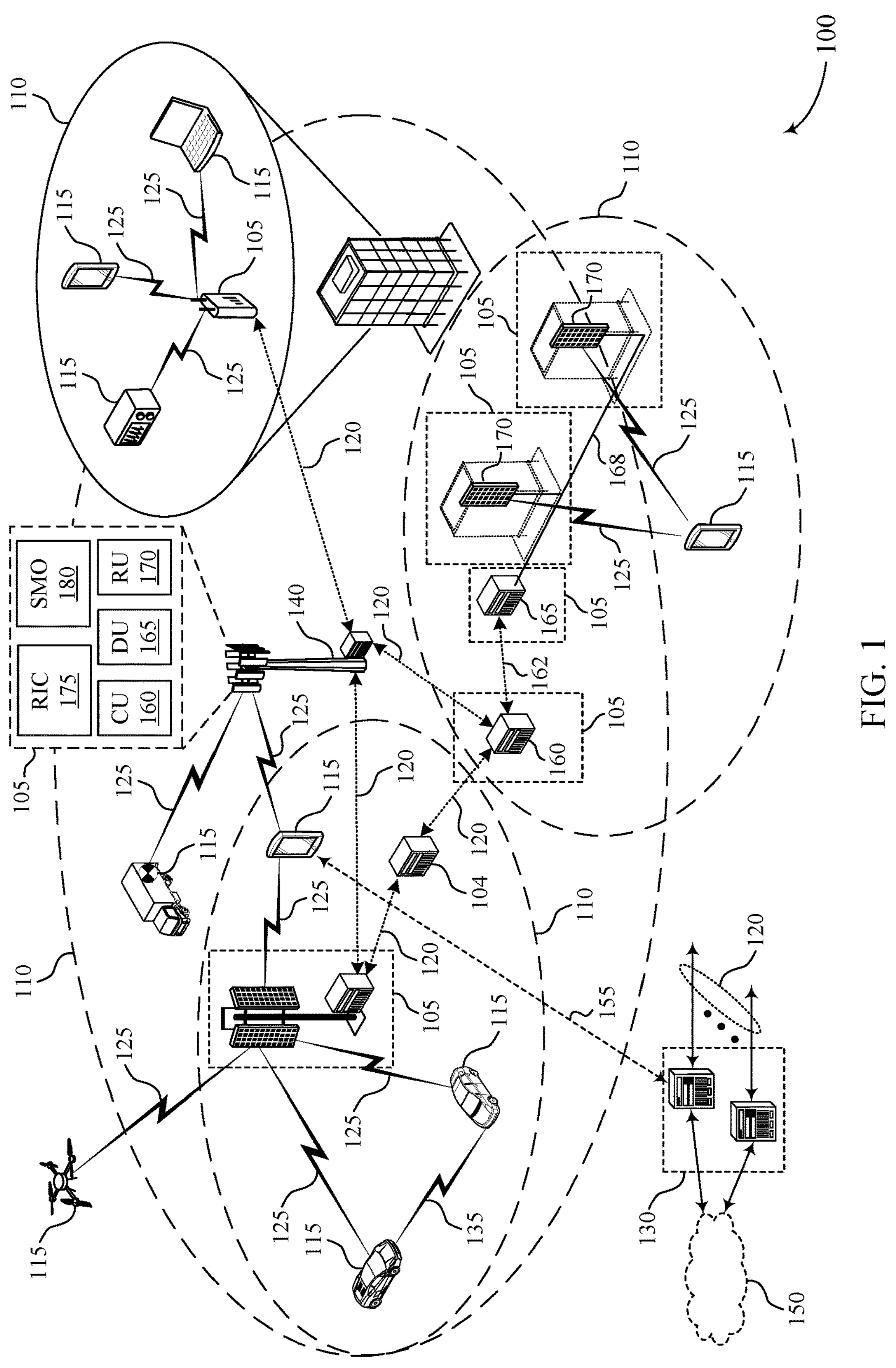
FIG. 1 illustrates an example of a wireless communications system that supports channel prioritization (CP) adaptation, in particular logical channel prioritization (LCP) adaptation in accordance with one or more aspects of the present disclosure.

Some wireless communications systems may support channel prioritization (CP), in particular logical channel prioritization (LCP). For example, a wireless device, such as a user equipment (UE), may receive signaling scheduling multiple data flows associated with a set of logical channels and each data flow may be associated with an LCP parameter set. The LCP parameter set may include a priority, a prioritized bit rate (PBR), and a bucket size duration (BSD). As such, the UE may calculate a prioritization variable, $B_j$, for each logical channel based on the associated set of LCP parameters. Thus, the UE may perform an LCP procedure in which the UE allocates resources to each logical channel based on the LCP parameter sets and calculated variables. For example, in a first phase of resource allocation (e.g., first phase of the LCP procedure), the UE may allocate resources to each logical channel with a calculated variable (e.g., $B_j$) greater than zero in a decreasing priority order, where the priority order is based on the priority values included in the respective LCP parameter sets. In a second phase of resource allocation, the UE may allocate remaining resources in a decreasing priority order (e.g., regardless of $B_j$).

In some cases, the priority (e.g., included in an LCP parameter set) for a data flow may be based on a respective throughput and a respective packet delay budget (PDB), such that data flows associated with low throughput may be prioritized over data flows associate with high throughput, and data flows associated with low PDBs may be prioritized over data flows associate with high PDBs. Accordingly, a data flow associated with a low throughput and a low PDB may have a higher priority level than a data flow associated with a high throughput and a high PDB. However, in some cases, a data flow may be associated with a high throughput and low PDB or a low throughput and a high PDB. In such cases, a fixed priority level associated with the data flow may result in increased latency or missed quality of service (QOS) requirements.

Accordingly, techniques described herein may enable a wireless device, such as a UE, to perform adaptive prioritization between multiple data flows. That is, the UE may receive signaling scheduling multiple data flows associated with a set of channels, in particular logical channels, and each data flow may be associated with a parameter set, in particular an LCP parameter set. The parameter set may include a priority, PBR, and BSD. The UE may calculate a deadline metric (DM) for each data flow based on one or more QoS parameters associated with the respective data flow, such as a throughput and PDB, based on the sets of one or more channel prioritization parameters. For example, the UE may calculate a time duration to flush a buffer associated with each data flow based on the throughput and a quantity of bits associated with the data flow, such that the DM associated with the data flow is based on the time duration and the respective PDB. The UE may adapt respective LCP parameter sets associated with one or more data flows of the multiple data flows based on the respective DMs. For example, the UE may adapt the priority associated with each data flow of the one or more data flows such that the data flows are prioritized in decreasing order of DM. As such, the UE may perform an LCP procedure (e.g., allocated resources) based on the adapted LCP parameter sets.

Aspects of the disclosure are initially described in the context of wireless communications systems. Aspects of the disclosure are then described in the context of adaptive prioritization scenarios and a process flow. Aspects of the disclosure are further illustrated by and described with reference to apparatus diagrams, system diagrams, and flowcharts that relate to LCP adaptation.

FIG. 1 illustrates an example of a wireless communications system 100 that supports LCP adaptation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support LCP adaptation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support adaptive prioritization of data flows associated with an LCP procedure. That is, the UE 115 may receive signaling scheduling multiple data flows associated with a set of logical channels and each data flow may be associated with an LCP parameter set, including a priority, PBR, and BSD. Additionally, the UE 115 may calculate a DM for each data flow based on one or more QoS parameters associated with the respective data flow, such as a throughput and PDB. For example, the UE 115 may calculate a time duration to flush a buffer associated with each data flow based on the throughput and a quantity of bits associated with the data flow, such that the DM associated with the data flow is based on the time duration and the respective PDB. The UE 115 may adapt respective LCP parameter sets associated with one or more data flows of the multiple data flows based on the respective DMs. For example, the UE 115 may adapt the priority associated with each data flow of the one or more data flows such that the data flows are prioritized in decreasing order of DM. As such, the UE 115 may perform an LCP procedure (e.g., allocated resources) based on the adapted LCP parameter sets.

Figure 2:
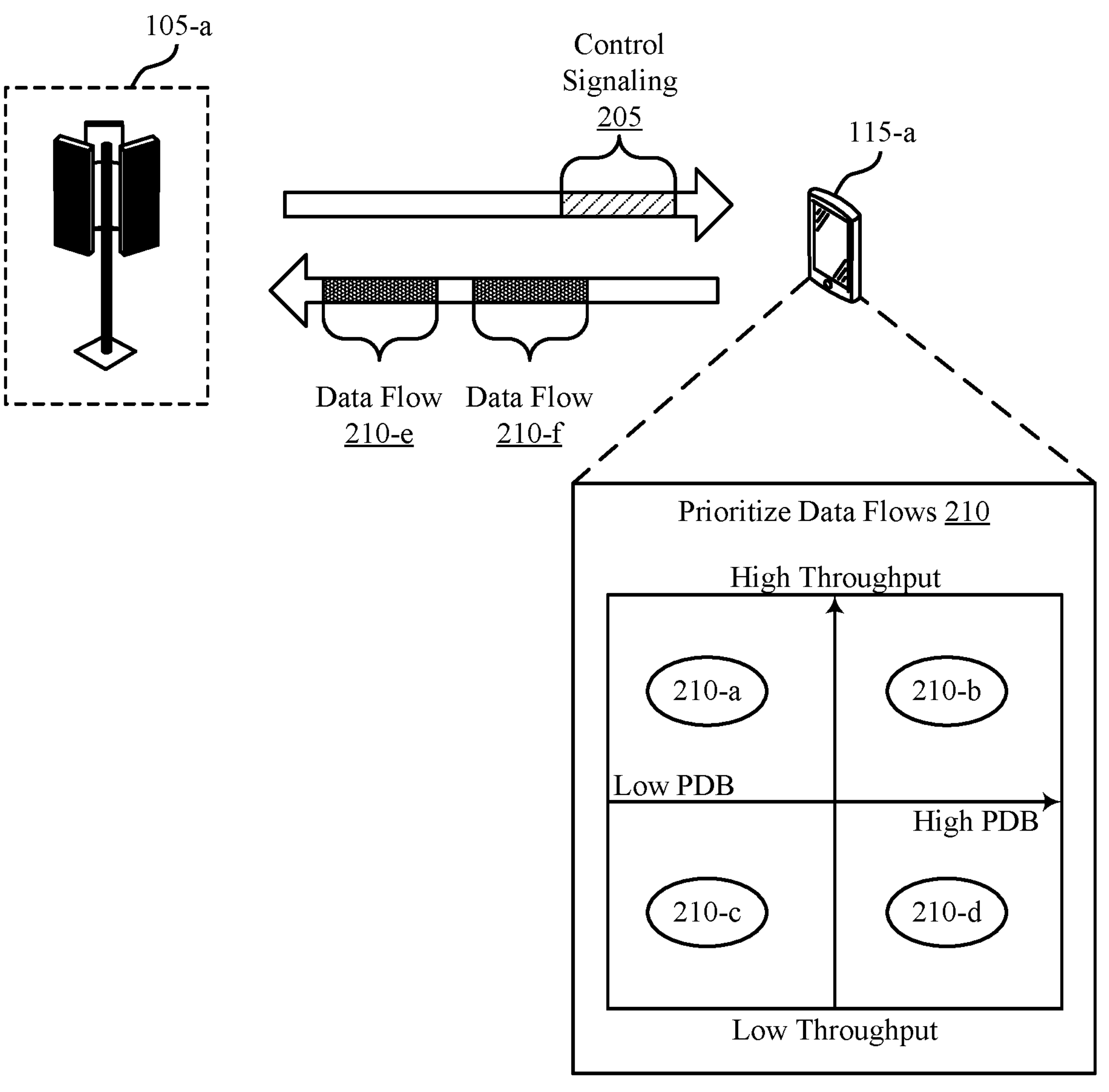
FIG. 2 illustrates an example of a wireless communications system that supports LCP adaptation in accordance with one or more aspects of the present disclosure.

FIG. 2 illustrates an example of a wireless communications system 200 that supports LCP adaptation in accordance with one or more aspects of the present disclosure. In some examples, the wireless communications system 200 may implement or be implemented by aspects of the wireless communications system 100. For example, the wireless communications system 200 may include one or more network entities 105 (e.g., a network entity 105-*a*) and one or more UEs 115 (e.g., a UE 115-*a*), which may be examples of the corresponding devices as described with reference to FIG. 1. In the example of FIG. 2, the network entity 105-*a* may be examples of a CU 160, a DU 165, an RU 170, a base station 140, an IAB node 104, or one or more other network nodes as described with reference to FIG. 1. The wireless communications system 200 may include features for adaptively prioritizing one or more data flows of a set of data flows based on DMs associated with the set of data flows.

Some wireless communications systems, such as the wireless communications system 200, may support LCP. That is, a wireless device, such as a UE 115-*a* may perform (e.g., apply) an LCP procedure based on receiving control signaling 205 scheduling a transmission (e.g., whenever a new transmission is performed). For example, the UE 115-*a* may receive control signaling 205 (e.g., an RRC message or other message) scheduling multiple data flows 210 (e.g., uplink data flows 210) associated with a set of logical channels (e.g., per MAC entity) and each data flow 210 may be associated with an LCP parameter set. That is, each data flow 210 may be associated with a logical channel (e.g., j) which may be associated with the respective set of LCP parameters. In some cases, each LCP parameter set may include one or more of a first parameter indicating a priority (e.g., priority) associated with the data flow 210, a second parameter indicating a PBR (e.g., prioritizedBitRate) for the data flow 210, a third parameter indicating a BSD (e.g., bucketSizeDuration) for the data flow 210, and a fourth parameter indicating a PDB (e.g., packet delay budget). The priority may be indicated via a priority value, where an increasing priority value indicates a lower priority level, and the PDB may indicate a time till a latency QoS metric associated with the respective data flow 210 expires.

As such, the UE 115-*a* may calculate a variable, $B_j$, associated with each data flow 210 (e.g., associated with each logical channel) based on the associated set of LCP parameters. $B_j$ may be positive or negative. For example, for a logical channel, the UE 115-*a* may initialize $B_j$ to zero (e.g., when the logical channel is established) and may increment $B_j$ by a calculated value for each transmission time interval (TTI) (e.g., each TTI that occurs without the logical channel being allocated resources). The calculated value may be equal to a product of a PBR associated with the logical channel times a duration of the TTI. In some examples, the value of $B_j$ may not exceed a threshold value, where the threshold value is associated with a BSD associated with the logical channel. In other words, the UE 115-*a* may set $B_j$ of the logical channel to the BSD associated with the logical channel when the value of $B_j$ meets or exceeds the BSD. Additionally, as discussed further in the context of an LCP procedure, the UE 115-*a* may decrement $B_j$ (e.g., the value of $B_j$) for each TTI that the UE 115-*a* allocates resources to the logical channel.

Thus, the UE 115-*a* may perform the LCP procedure for the multiple data flows 210 based on the LCP parameter set and the calculated variable, $B_j$, associated with each data flow 210. That is, the UE 115-*a* may allocate resources to each logical channel (e.g., each data flow 210) based on a comparison of the calculated variable associated with each data flow 210 and one or more parameters from the LCP parameter set associated with each data flow 210. For example, in a first phase of the LCP procedure (e.g., logical channel resource allocation), the UE 115-*a* may identify a first subset of logical channels from the set of logical channels (e.g., selected for an uplink grant) associated with values of $B_j$ that exceed a threshold (e.g., zero) and may allocate resources to the first subset of logical channels in a decreasing priority order. That is, the UE 115-*a* may allocate resources to a first logical channel from the first subset of logical channels before a second logical channel from the first subset of logical channels based on the first logical channel being associated with a priority value (e.g., indicated via the LCP parameter set associated with the first logical channel) smaller than a priority value (e.g., indicated via the LCP parameter set associated with the second logical channel) associated with the second logical channel. In some examples, a PBR associated with a third logical channel from the first subset of logical channels may be equal to infinity, such that the UE 115-*a* (e.g., MAC entity) may allocate resources for the entire data flow 210 associated with the third logical channel prior to allocating resources to (e.g., before meeting the PBR of) other logical channels associated with lower priorities. Additionally, the UE 115-*a* may decrement the values of $B_j$ associated with the first set of logical channels by a total size of service data units (SDUs) (e.g., MAC SDUs) served to the first subset of logical channels. In other words, the UE 115-*a* may decrement a value of $B_j$ associated with a first logical channel from the first set of logical channels based on allocating resources to the first logical channel during the first phase of the LCP procedure. Further, the UE 115-*a* may decrement the value of $B_j$ associated with the first logical channel by a total size of SDUs served to the first logical channel.

In a second phase of the LCP procedure (e.g., if any resources remain), the UE 115-*a* may allocate resources to a second subset of logical channels (e.g., the remaining logical channels) from the set of logical channels in a decreasing priority order (e.g., regardless of the respective values of $B_j$ associated with the second subset of logical channels). The UE 115-*a* may allocate the resources to the second subset of logical channels until data associated with the data flows 210 associated with the second subset of logical channels is exhausted (e.g., is fully allocated) or until resources associated with an uplink grant scheduling the set of logical channels is exhausted (e.g., runs out). In some examples, the UE 115-*a* may allocate resources to two logical channels associated with equal priorities equally.

In some cases, a priority (e.g., included in an LCP parameter set) for a data flow 210 may be based on a respective throughput and a respective PDB, such that data flows 210 associated with low throughput (e.g., mice flow) may be prioritized over data flows 210 associate with high throughput (e.g., elephant flow), and data flows 210 associated with low PDBs (e.g., latency sensitive) may be prioritized over data flows 210 associate with high PDBs (e.g., latency tolerant). For example, a data flow 210-*c* (e.g., associated with a low throughput) may be associated with a priority greater than a priority associated with the data flow 210-*a* (e.g., associated with a high throughput). Similarly, a data flow 210-*c* (e.g., associated with a low PDB) may be associated with a priority greater than a priority associated with the data flow 210-*d* (e.g., associated with a high PDB). Accordingly, a data flow 210 associated with a low throughput and a low PDB, such as the data flow 210-*c*, may have a higher priority (e.g., lower priority value) than a data flow 210, such as a data flow 210-*b*, associated with a high throughput and a high PDB (e.g., according to a thumb rule for priority settings). However, in some cases, a data flow 210 may be associated with a high throughput and low PDB (e.g., such as the data flow 210-*a*) or a low throughput and a high PDB (e.g., such as the data flow 210-*d*). In such cases, a fixed priority (e.g., as indicated with an LCP parameter set) associated with the data flow 210 may result in increased latency.

Accordingly, techniques described herein may enable the UE 115-*a* to adapt priorities of one or more data flows 210 associated with an LCP procedure. For example, the UE 115-*a* may receive, from a network entity 105-*a*, control signaling 205 scheduling multiple data flows 210 associated with a set of logical channels, such as a data flow 210-*e* associated with a first logical channel and a data flow 210-*f* associated with a second logical channel. That is, the control signaling 205 may indicate an uplink grant associated with the data flow 210-*e* and the data flow 210-*f*. Additionally, each data flow 210 may be associated with an LCP parameter set (e.g., indicated via the control signaling 205), such as a first LCP parameter set associated with data flow 210-*e* and a second LCP parameter set associated with the data flow 210-*f*.

In some cases, the UE 115-*a* may calculate a DM for each data flow 210, where the DM is based on (e.g., is a function of) a PDB and a throughput or payload size associated with each data flow 210. That is, the DM may be a metric associated with a likelihood that the UE 115-*a* may transmit a data flow 210 satisfying the respective PDB (e.g., a likelihood that the UE 115-*a* may transmit the data flow 210 before a deadline, where the deadline is based on the PDB). For example, the UE 115-*a* may calculate a first DM associated with the data flow 210-*e* based on a PDB associated with the data flow 210-*e* (e.g., $PDB_1$) and a throughput associated with the data flow 210-*e* (e.g., $Tput_1$) and may calculate a second DM associated with the data flow 210-*f* based on a PDB associated with the data flow 210-*f* (e.g., $PDB_2$) and a throughput associated with the data flow 210-*f* (e.g., $Tput_2$).

In some examples, the UE 115-*a* may calculate the DM for each data flow 210 based on a time (e.g., duration) associated with flushing a buffer associated with each data flow 210 (e.g., to maximize a quantity of data flows 210 that satisfy a latency QoS metric based on the respective PDBs). The time associated with flushing a buffer associated with a data flow 210 may be a time span (e.g., duration) between the UE 115-*a* initiating storage of the data flow 210 in the buffer and completing transmission of the data flow 210 (e.g., clearing the buffer of all data associated with the data flow 210). That is, at a first time, the UE 115-*a* may retrieve data associated with a data flow 210 and initiate storage of the data associated with the data flow 210 in a buffer associated with the data flow 210. Additionally, over a time span between the first time and a second time, the UE 115-*a* may transmit (e.g., continuously or non-continuously) the data associated with the data flow 210, transmitting a last bit of data associated with the data flow 210 at the second time. As such, the time associated with flushing the buffer associated with the data flow 210 may be the duration (e.g., time) between the first time and the second time. In other words, the time associated with flushing the buffer associated with the data flow 210 may be a duration associated with removing (e.g., transmitting, flushing) all data associated with the data flow 210 from the buffer. For example, the UE 115-*a* may calculate a first time, $t_1$, associated with flushing a buffer associated with the data flow 210-*e* based on a quantity of bits associated with the data flow 210-*e* (e.g., $\#Bits_1$) and the throughput associated with the data flow 210-*e* (e.g., $Tput_1$). Additionally, the UE 115-*a* may calculate a second time, $t_2$, associated with flushing a buffer associated with the data flow 210-*f* based on a quantity of bits associated with the data flow 210-*f* (e.g., $\#Bits_2$) and the throughput associated with the data flow 210-*f* (e.g., $Tput_2$). In other words, the UE 115-*a* may calculate $t_1$ and $t_2$ according to the following Equation 1:

$$t_1 = \frac{\#\mathrm{Bits}_1}{Tput_1} \tag{1}$$

$$t_2 = \frac{\#\mathrm{Bits}_2}{Tput_2}$$

Accordingly, the UE 115-*a* may calculate the first DM associated with the data flow 210-*e* based on the first time, $t_1$, and the PDB associated with the data flow 210-*e* and the second DM associated with the data flow 210-*f* based on the second time, $t_2$, and the PDB associated with the data flow 210-*f*. In some examples, the UE 115-*a* may determine the first DM with respect to the second DM (e.g., or visa-versa). That is, the UE 115-*a* may calculate the first DM and the second DM as a function to maximize a quantity of data flows 210 that satisfy a latency QoS metric associated with the respective PDBs. For example, the UE 115-*a* may calculate a combined DM for the data flow 210-*e* associated with the first logical channel and the data flow 210-*f* associated with the second logical channel according to the following Equation 2:

$$DM = F_{max}(t_1, t_2, PDB_1, PDB_2) \tag{2}$$

That is, the UE 115-*a* may calculate the combined DM as a function of the first time, the second time, the PDB associated with the data flow 210-*e*, and the PDB associated with the data flow 210-*f*, such that the UE 115-*a* may maximize a quantity (e.g., number) of data flows 210 that satisfy (e.g., meet) the latency QoS metric associated with the respective PDBs.

In some other examples, the UE 115-*a* may calculate a DM for each data flow according to the following Equation 3:

$$DM = w_1\left(\frac{1}{PDB}\right) + w_2\left(\frac{1}{Tput}\right) \quad (3)$$

where $w_1$ is a first scaling parameter (i.e., first scaling factor, first weight) associated with PDB and $w_2$ is a second scaling parameter (i.e. second scaling factor, second weight) associated with throughput. That is, the first scaling parameter and the second scaling parameter may be weights (e.g., selected by the UE 115-*a*, configured by the network entity 105-*a*, pre-configured) associated with maximizing a quantity (e.g., number) of data flows 210 that satisfy (e.g., meet) the latency QoS metric associated with the respective PDBs. That is, the DM in the context of Equation 3 may be a weighted DM (WDM). In some cases, the control signaling 205 may include an indication of the first scaling parameter and the second scaling parameter. Additionally, or alternatively, the first scaling parameter and the second scaling parameter may maximize (e.g., may be chosen, by the UE 115-*a* or the network entity 105-*a*, to maximize) a quantity of data flows 210 that satisfy a latency QoS metric associated with the respective PDBs Accordingly, the UE 115-*a* may adapt (e.g., adjust, modify) the priority associated with the data flow 210-*e*, the priority associated with the data flow 210-*f*, or both, based on the first DM and the second DM. That is, a data flow 210 associated with a greater (e.g., larger, higher) DM may be associated with a higher priority (e.g., lower priority value) with respect to a data flow 210 associated with a lower DM (e.g., and visa-versa). For example, the first DM may be greater than the second DM (e.g., DM (data flow 210-*e*) >DM (data flow 210-*f*)) such that the UE 115-*a* may adapt the priority associated with the data flow 210-*e*, the priority associated with the data flow 210-*f*, or both, such that the data flow 210-*e* is associated with a higher priority than the data flow 210-*f*.

In some examples, the UE 115-*a* may adapt the priority associated with the data flow 210-*e*, the priority associated with the data flow 210-*f*, or both, by adjusting a priority value associated with the data flow 210-*e*, a priority value associated with the data flow 210-*f*, or both. That is, the UE 115-*a* may adjust the priority value associated with the data flow 210-*e*, the priority value associated with the data flow 210-*f*, or both, based on adjusting the respective LCP parameter sets.

In some other examples, the control signaling 205 may indicate multiple LCP parameter sets associated with each data flow 210 such that the UE 115-*a* may adapt the priority associated with the data flow 210-*e*, the priority associated with the data flow 210-*f*, or both, based on selecting one or more LCP parameter sets (e.g., a new LCP parameter set) from the multiple LCP parameters sets associated with each data flow 210. For example, the control signaling 205 may indicate a first set of LCP parameter sets associated with the data flow 210-*e* and a second set of LCP parameter sets associated with the data flow 210-*f*. Additionally, based on calculating the first DM and the second DM may determine that the data flow 210-*e* is associated with a higher priority than the data flow 210-*f*. Accordingly, the UE 115-*a* may select an adapted LCP parameter set for the data flow 210-*e* from the first set of LCP parameter sets, may select an adapted LCP parameter set for the data flow 210-*f* from the second set of LCP parameter sets, or both, such that the priority associated with the data flow 210-*e* is greater than the priority associated with the data flow 210-*f* (e.g., the data flow 210-*e* is prioritized over the data flow 210-*f*).

For example, the UE 115-*a* may select the adapted LCP parameter set for the data flow 210-*e* from the first set of LCP parameter sets, may select the adapted LCP parameter set for the data flow 210-*f* from the second set of LCP parameter sets, or both, such that a priority value associated with the data flow 210-*e* is less than a priority value associated with the data flow 210-*f* (e.g., increasing priority value indicates a lower priority level). In other words, the UE 115-*a* may select the one or more adapted LCP parameter sets such that an adapted priority value associated with the data flow 210-*e* is less than an original (e.g., un-adapted, indicated by the network entity 105-*a*) priority value associated with the data flow 210-*f*, an original priority value associated with the data flow 210-*e* is less than an adapted priority value associated with the data flow 210-*f*, or the adapted priority value associated with the data flow 210-*e* is less than the adapted priority value associated with the data flow 210-*f*.

Additionally, or alternatively, the UE 115-*a* may select the adapted LCP parameter set for the data flow 210-*e* from the first set of LCP parameter sets, may select the adapted LCP parameter set for the data flow 210-*f* from the second set of LCP parameter sets, or both, such that a PBR associated with the data flow 210-*e* is greater than (e.g., faster than) a PBR associated with the data flow 210-*f*. In other words, the UE 115-*a* may select the one or more adapted LCP parameter sets such that an adapted PBR associated with the data flow 210-*e* is greater than an original (e.g., un-adapted, indicated by the network entity 105-*a*) PBR associated with the data flow 210-*f*, an original PBR associated with the data flow 210-*e* is greater than an adapted PBR associated with the data flow 210-*f*, or the adapted PBR associated with the data flow 210-*e* is greater than the adapted PBR associated with the data flow 210-*f*.

Additionally, or alternatively, the UE 115-*a* may select the adapted LCP parameter set for the data flow 210-*e* from the first set of LCP parameter sets, may select the adapted LCP parameter set for the data flow 210-*f* from the second set of LCP parameter sets, or both, such that a BSD associated with the data flow 210-*e* is greater than (e.g., longer than) a BSD associated with the data flow 210-*f*. In other words, the UE 115-*a* may select the one or more adapted LCP parameter sets such that an adapted BSD associated with the data flow 210-*e* is greater than an original (e.g., un-adapted, indicated by the network entity 105-*a*) BSD associated with the data flow 210-*f*, an original BSD associated with the data flow 210-*e* is greater than an adapted BSD associated with the data flow 210-*f*, or the adapted BSD associated with the data flow 210-*e* is greater than the adapted BSD associated with the data flow 210-*f*.

Though described in the context of priority value, PBR, and BSD, this is not to be regarded as a limitation of the present disclosure. That is, LCP parameter sets may include any quantity and type of parameters, each of which may be selected (e.g., adapted) to prioritize one or more data flows 210.

As such, the UE 115-*a* may perform an LCP procedure associated with the data flow 210-*e* and the data flow 210-*f* based on the adapted LCP parameter set(s). In other words, the UE 115-*a* may allocate resources to the logical channels associated with the data flow 210-*e* and the data flow 210-*f* based on the adapted LCP parameters and may transmit the data flow 210-*e* and the data flow 210-*f* based on the resource allocation. In some examples, a higher priority data flow 210 (e.g., based on one or more adapted LCP parameters), such as the data flow 210-*e*, may arrive at a buffer of the UE 115-*a* before (e.g., prior to) or at a same time as a lower priority data flow 210, such as the data flow 210-*f*. In such cases the UE 115-*a* may transmit the data flow 210-*e* and may transmit the data flow 210-*f* based on completing (e.g., after) transmission of the data flow 210-*e* (e.g., based on the resource allocation). In some other examples, the higher priority data flow 210 (e.g., the data flow 210-*e*), may arrive at the buffer of the UE 115-*a* after a lower priority data flow 210 (e.g., data flow 210-*f*). In such cases, the UE 115-*a* may pause transmission of the data flow 210-*f* to transmit the data flow 210-*e* (e.g., based on the resource allocation). In other words, the UE 115-*a* may transmit a first portion of the data flow 210-*f* (e.g., before the data flow 210-*e* arrives at the buffer), may transmit the data flow 210-*e*, and may transmit a second portion of the data flow 210-*f* based on completing transmission of the data flow 210-*e*, where the data flow 210-*f* includes the first portion and the second portion.

While much of the present disclosure is described in the context of logical channels, this is not to be regarded as a limitation of the present disclosure, In this regard, any type of channel (e.g., other types of channels), such as a physical channel, may be considered with reference to the techniques described herein.

Additionally, while much of the present disclosure described in the context of two data flows 210 (e.g., the data flow 210-*e* and the data flow 210-*f*) this is not to be regarded as a limitation of the present disclosure. In this regard, any quantity of data flows 210 may be considered with reference to the techniques described herein.

Additionally, while much of the present disclosure is described in the context of communications (e.g., Uu communications) between a network entity 105 (e.g., the network entity 105-*a*) and a UE 115 (e.g., the UE 115-*a*) this is not to be regarded as a limitation of the present disclosure. In this regard, techniques described herein may be applied between any type or quantity of wireless devices including, but not limited to, one or more UEs 115, one or more network entities 105, or any combination thereof. For example, techniques described herein may be applied to sidelink communications between a first UE 115 and a second UE 115 (e.g., where the first UE 115 or the second UE 115 performs functions similar to the network entity 105-*a* in the context of FIG. 2).

Figure 3A:
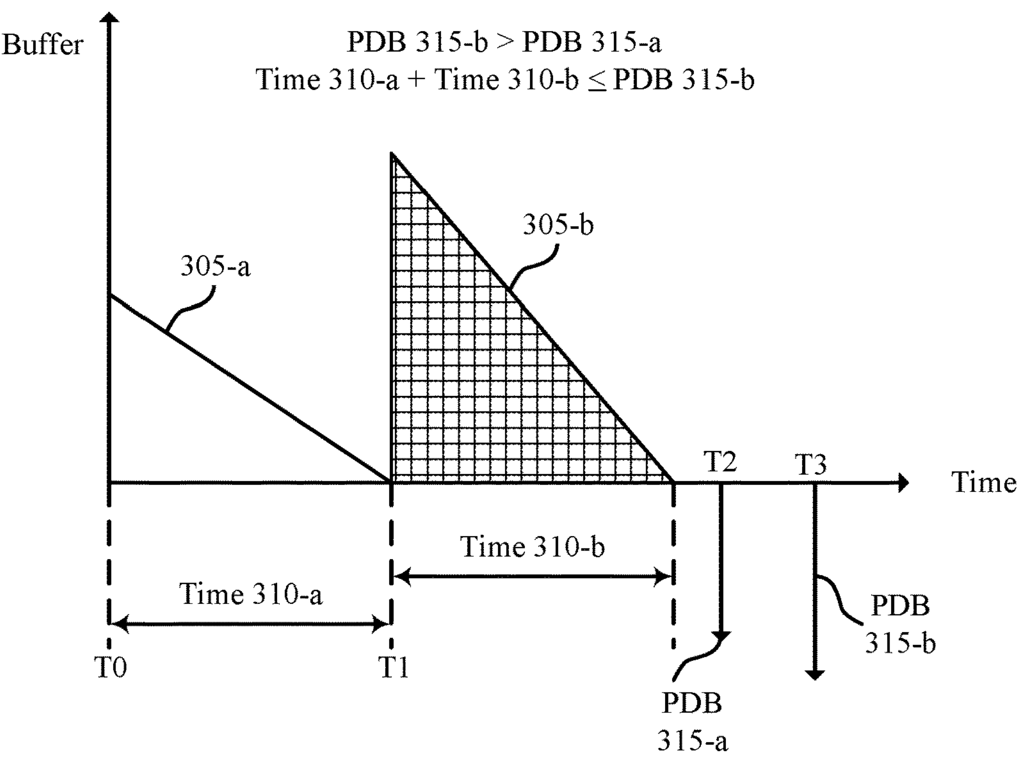
FIGS. 3A and 3B each illustrate examples of adaptive prioritization scenarios that supports LCP adaptation in accordance with one or more aspects of the present disclosure.
Figure 3A:
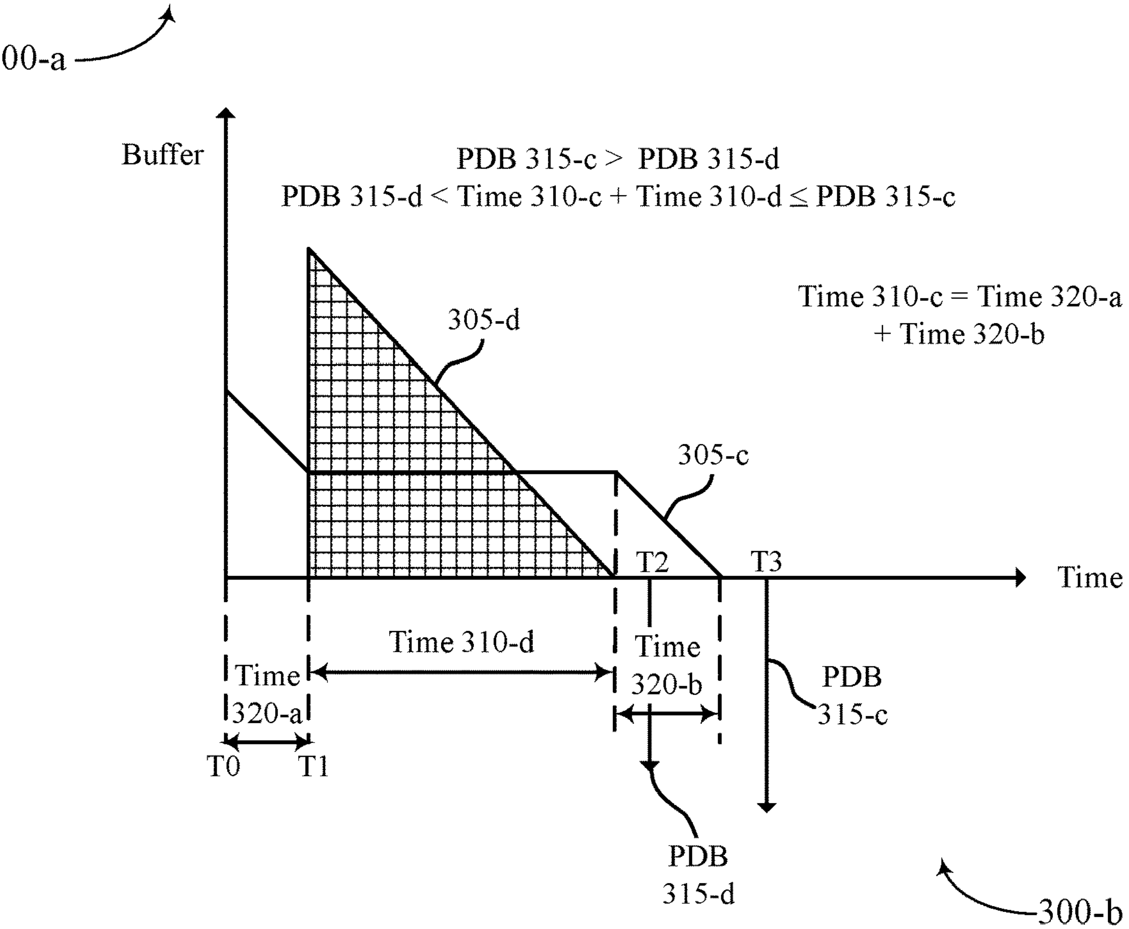
Figure 3B:
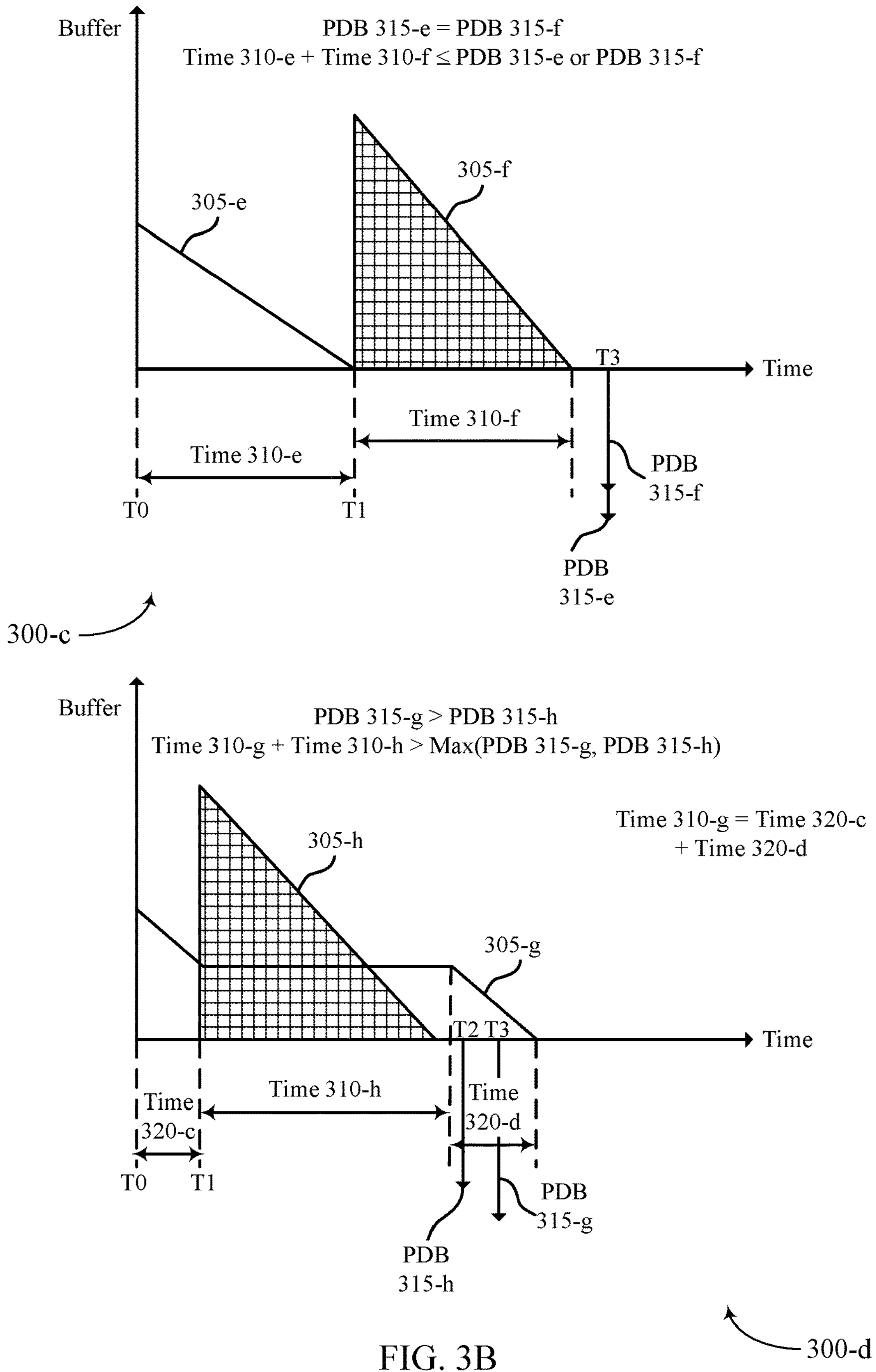

FIGS. 3A and 3B each illustrate examples of adaptive prioritization scenarios 300 that supports LCP adaptation in accordance with one or more aspects of the present disclosure. In some examples, the adaptive prioritization scenarios 300 (e.g., an adaptive prioritization scenario 300-*a*, an adaptive prioritization scenario 300-*b*, an adaptive prioritization scenario 300-*c*, and an adaptive prioritization scenario 300-*d*) may implement or be implemented by aspects of the wireless communications system 100 and the wireless communications system 200. For example, the adaptive prioritization scenario 300 may be implemented by one or more network entities 105 and one or more UEs 115, which may be examples of the corresponding devices as described with reference to FIG. 1. In the example of FIGS. 3A and 3B, the network entity 105 may be examples of a CU 160, a DU 165, an RU 170, a base station 140, an IAB node 104, or one or more other network nodes as described with reference to FIG. 1. The adaptive prioritization scenario 300 may include features for adaptively prioritizing one or more data flows of a set of data flows based on DMs associated with the set of data flows.

As described with reference to FIG. 2, a UE 115 may perform adaptive LCP in which the UE 115 receives control signaling scheduling multiple data flows 305 associated with a set of logical channels, where each data flow 305 is associated with an LCP parameter set, the LCP parameter set including a priority, a PDB 315, and a BSD.

Additionally, the UE 115 may calculate a DM for each data flow 305 from the multiple data flows 305, where the DM is based on (e.g., is a function of) a PDB 315 and a throughput or payload size associated with each data flow 305. In some examples, the UE 115 may calculate the DM for each data flow 305 based on a time associated with flushing a buffer associated with each data flow 305 (e.g., calculated based on a function of the time associated with flushing the buffer associated with each data flow, as described with reference to Equation 2 and Equation 3 in FIG. 2). For example, with reference to the adaptive prioritization scenario 300-*a*, the UE 115 may calculate a time 310-*a* associated with flushing a buffer associated with a data flow 305-*a* based on a quantity of bits associated with the data flow 305-*a* and a throughput associated with the data flow 305-*a*. Additionally, the UE 115 may calculate a time 310-*b* associated with flushing a buffer associated with a data flow 305-*b* based on a quantity of bits associated with the data flow 305-*b* and a throughput associated with the data flow 305-*b*.

Accordingly, the UE 115 may adapt one or more parameters from at least one LCP parameter set associated with a data flow 305 from the multiple data flows 305 such that the UE may prioritize the multiple data flows 305 based on the one or more adapted parameters. For example, in the adaptive prioritization scenario 300-*a*, the UE 115 may receive control signaling scheduling the data flow 305-*a* and the data flow 305-*b*, where the data flow 305-*a* is associated with a PDB 315-*a* and the data flow 305-*b* is associated with a PDB 315-*b*. Additionally, the UE 115 may calculate the time 310-*a* associated with flushing the buffer associated with the data flow 305-*a* and the time 310-*b* associated with flushing the buffer associated with the data flow 305-*b*. In the example of the adaptive prioritization scenario 300-*a*, the PDB 315-*b* may be greater than the PDB 315-*a* and a summation (e.g., combination) of the time 310-*a* and the time 310-*b* may be less than or equal to the PDB 315-*b*. In such cases, adaptive LCP performed by the UE 115 may result in the UE 115 prioritizing the data flow 305-*a* over the data flow 305-*b*. That is, the UE 115 may calculate one or more DMs based on the time 310-*a*, the time 310-*b*, the PDB 315-*a*, and the PDB 315-*b*, and adapt one or more CP parameters associated with the data flow 305-*a*, the data flow 305-*b*, or both, such that the UE 115 prioritizes the data flow 305-*a* over the data flow 305-*b*. As such, the UE 115 may transmit the data flow 305-*a* (e.g., based on a resource allocation) and transmit the data flow 305-*b* after completing transmission of the data flow 305-*a* based on the performing the adaptive LCP procedure (e.g., based on the data flow 305-*a* arriving at a buffer of the UE 115 before the data flow 305-*b*). In such cases, the UE 115 may satisfy a latency QoS metric associated with the data flow 305-*a* (e.g., based on the PDB 315-*a*) and a latency QoS metric associated with the data flow 305-*b* (e.g., based on the PDB 315-*b*) based on completing transmission of the data flow 305-*a* within a duration of the PDB 315-*a* (e.g., from T0 to T2) and completing transmission of the data flow 305-*b* within a duration of the PDB 315-*b* (e.g., from T1 to T3).

In another example, such as in an adaptive prioritization scenario 300-*b*, the UE 115 may receive control signaling scheduling a data flow 305-*c* and the data flow 305-*d*, where the data flow 305-*c* is associated with a PDB 315-*c* and the data flow 305-*d* is associated with a PDB 315-*d*. Additionally, the UE 115 may calculate a time 310-*c* associated with flushing the buffer associated with the data flow 305-*c* and a time 310-*d* associated with flushing the buffer associated with the data flow 305-*d*. In the example of the adaptive prioritization scenario 300-*b*, the PDB 315-*c* may be greater than the PDB 315-*d* and a summation of the time 310-*c* and the time 310-*d* may be greater than the PDB 315-*d* but less than or equal to the PDB 315-*c*. In such cases, adaptive LCP performed by the UE 115 may result in the UE 115 prioritizing the data flow 305-*d* over the data flow 305-*c*. That is, the UE 115 may calculate one or more DMs based on the time 310-*c*, the time 310-*d*, the PDB 315-*c*, and the PDB 315-*d*, and adapt one or more LCP parameters associated with the data flow 305-*c*, the data flow 305-*d*, or both, such that the UE 115 prioritizes the data flow 305-*d* over the data flow 305-*c*. As such, the UE 115 may transmit the data flow 305-*c* during a time 320-*a*, transmit the data flow 305-*d* during the time 310-*d*, and transmit a second portion of the data flow 305-*c* during a time 320-*b* based on the data flow 305-*c* arriving at a buffer of the UE 115 before the data flow 305-*d*, where the data flow 305-*c* includes the first portion and the second portion and the time 310-*c* includes the time 320-*a* and the time 320-*b*. In other words, the UE 115 may pause transmission of the data flow 305-*c* to transmit the data flow 305-*d*, based on the performing the adaptive LCP procedure (e.g., based on the one or more adapted LCP parameters). In such cases, the UE 115 may satisfy a latency QoS metric associated with the data flow 305-*c* (e.g., based on the PDB 315-*c*) and a latency QoS metric associated with the data flow 305-*d* (e.g., based on the PDB 315-*d*) based on completing transmission of the data flow 305-*c* within a duration of the PDB 315-*c* (e.g., from T0 to T3) and completing transmission of the data flow 305-*d* within a duration of the PDB 315-*d* (e.g., from T1 to T2).

In another example, such as in an adaptive prioritization scenario 300-*c*, the UE 115 may receive control signaling scheduling the data flow 305-*e* and the data flow 305-*f* where the data flow 305-*e* is associated with a PDB 315-*e* and the data flow 305-*f* is associated with a PDB 315-*f*. Additionally, the UE 115 may calculate a time 310-*e* associated with flushing the buffer associated with the data flow 305-*e* and a time 310-*f* associated with flushing the buffer associated with the data flow 305-*f* In the example of the adaptive prioritization scenario 300-*c*, the PDB 315-*e* may be equal to the PDB 315-*f* and a summation of the time 310-*e* and the time 310-*f* may be less than or equal to the PDB 315-*e* or the PDB 315-*f*. In such cases, adaptive LCP performed by the UE 115 may result in the UE 115 prioritizing the data flow 305-*e* over the data flow 305-*f*. That is, the UE 115 may calculate one or more DMs based on the time 310-*e*, the time 310-*f*, the PDB 315-*e*, and the PDB 315-*f*, and adapt one or more CP parameters associated with the data flow 305-*e*, the data flow 305-*f*, or both, such that the UE 115 prioritizes the data flow 305-*e* over the data flow 305-*f*. As such, the UE 115 may transmit the data flow 305-*e* (e.g., based on a resource allocation) and transmit the data flow 305-*f* after completing transmission of the data flow 305-*e* based on the performing the adaptive LCP procedure (e.g., and based on the data flow 305-*e* arriving at a buffer of the UE 115 before the data flow 305-*f*). In such cases, the UE 115 may satisfy a latency QoS metric associated with the data flow 305-*e* (e.g., based on the PDB 315-*e*) and a latency QoS metric associated with the data flow 305-*f* (e.g., based on the PDB 315-*f*) based on completing transmission of the data flow 305-*e* within a duration of the PDB 315-*e* (e.g., from T0 to T3) and completing transmission of the data flow 305-*f* within a duration of the PDB 315-*f* (e.g., from T1 to T3).

In another example, such as in an adaptive prioritization scenario 300-*d*, the UE 115 may receive control signaling scheduling a data flow 305-*g* and the data flow 305-*h*, where the data flow 305-*g* is associated with a PDB 315-*g* and the data flow 305-*h* is associated with a PDB 315-*h*. Additionally, the UE 115 may calculate a time 310-*g* associated with flushing the buffer associated with the data flow 305-*g* and a time 310-*h* associated with flushing the buffer associated with the data flow 305-*h*. In the example of the adaptive prioritization scenario 300-*d*, the PDB 315-*g* may be greater than the PDB 315-*h* and a summation of the time 310-*g* and the time 310-*h* may be greater than a maximum value of the PDB 315-*g* and the PDB 315-*h*. In other words, the UE 115 may be unable to satisfy both a latency QoS metric associated with the data flow 305-*g* and a latency QoS metric associated with the data flow 305-*h*. In such cases, adaptive LCP performed by the UE 115 may result in the UE 115 prioritizing the data flow 305-*h* over the data flow 305-*g* (e.g., based on the PDB 315-*h* being less than the PDB 315-*g*). That is, the UE 115 may calculate one or more DMs based on the time 310-*g*, the time 310-*h*, the PDB 315-*g*, and the PDB 315-*h*, and adapt one or more CP parameters associated with the data flow 305-*g*, the data flow 305-*h*, or both, such that the UE 115 prioritizes the data flow 305-*h* over the data flow 305-*g*. As such, the UE 115 may transmit the data flow 305-*g* during a time 320-*c*, transmit the data flow 305-*h* during the time 310-*h*, and transmit a second portion of the data flow 305-*g* during a time 320-*d* based on the data flow 305-*g* arriving at a buffer of the UE 115 before the data flow 305-*h*, where the data flow 305-*g* includes the first portion and the second portion and the time 310-*g* includes the time 320-*c* and the time 320-*d*. In other words, the UE 115 may pause transmission of the data flow 305-*g* to transmit the data flow 305-*h*, based on the performing the adaptive LCP procedure (e.g., based on the one or more adapted LCP parameters). In such cases, the UE 115 may satisfy the latency QoS metric associated with the data flow 305-*h* (e.g., based on the PDB 315-*h*) based on completing transmission of the data flow 305-*h* within a duration of the PDB 315-*h* (e.g., from T1 to T2). Conversely, the UE 115 may be unable to satisfy the latency QoS metric associated with the data flow 305-*g* (e.g., based on the PDB 315-*g*) based on completing transmission of the data flow 305-*g* outside a duration of the PDB 315-*g* (e.g., failing to complete transmission of the data flow 305-*g* within the duration of the PDB 315-*g*, from T0 to T3).

Though described in the context of the adaptive prioritization scenario 300-*a*, the adaptive prioritization scenario 300-*b*, the adaptive prioritization scenario 300-*c*, and the adaptive prioritization scenario 300-*d*, this is not to be regarded as a limitation of the present disclosure. In this regard, additional adaptive prioritization scenarios 300 may be considered with reference to the techniques described herein.

Figure 4:
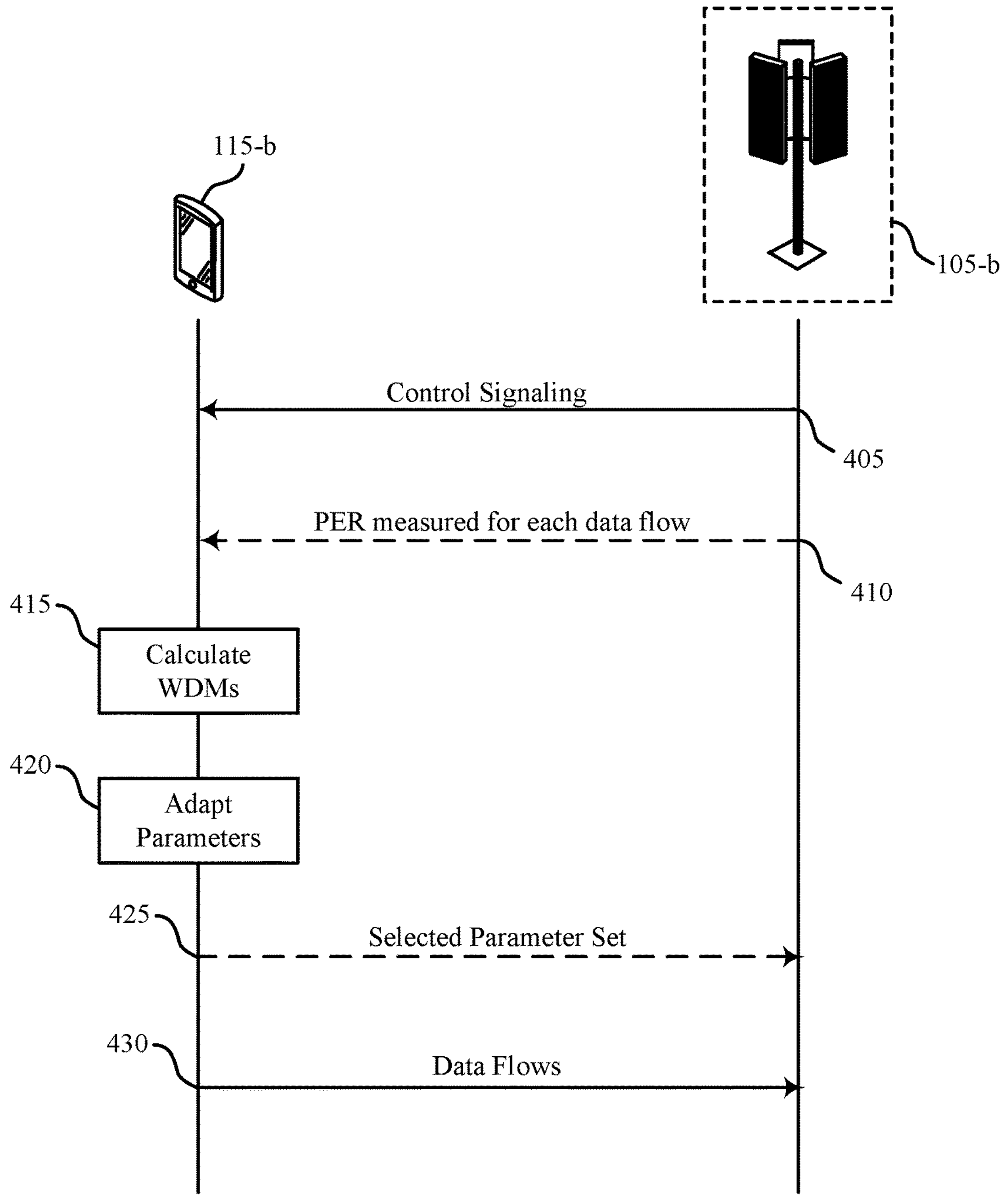
FIG. 4 illustrates an example of a process flow that supports LCP adaptation in accordance with one or more aspects of the present disclosure.

FIG. 4 illustrates an example of a process flow 400 that supports LCP adaptation in accordance with one or more aspects of the present disclosure. In some examples, the process flow 400 may implement or be implemented by aspects of the wireless communications system 100, the wireless communications system 200, and the adaptive prioritization scenarios 300. For example, the process flow 400 may include one or more network entities 105 (e.g., a network entity 105-*b*) and one or more UEs 115 (e.g., a UE 115-*b*), which may be examples of the corresponding devices as described with reference to FIG. 1. In the example of FIG. 4, the network entity 105-*b* may be examples of a CU 160, a DU 165, an RU 170, a base station 140, an IAB node 104, or one or more other network nodes as described with reference to FIG. 1. The process flow 400 may include features for adaptively prioritizing one or more data flows of a set of data flows based on DMs associated with the set of data flows.

At 405, the UE 115-*b* may receive, from the network entity 105-*b*, signaling (e.g., RRC message) scheduling multiple data flows associated with a set of logical channels and each data flow of the multiple data flows being associated with a set of one or more LCP parameters (e.g., an LCP parameter set). In other words, each data flow from the multiple data flows may be associated with a logical channel from the set of logical channels (e.g., associated with an LCP parameter set). The set of one or more LCP parameters may include a priority, a PDB, a BSD, or any combination thereof.

In some examples, the UE 115-*b* may receive, from the network entity 105-*b*, second signaling indicating the set of one or more LCP parameters associated with each data flow of the multiple data flows. In some examples, the signaling scheduling the multiple data flows may be the same as the second signaling. In some examples, the set of one or more LCP parameters associated with each data flow of the multiple data flows may include one or more scaling parameters associated with one or more QoS parameters, including at least a first scaling parameter (e.g., $w_1$ as described with reference to FIG. 2) associated with PDB and a second scaling parameter (e.g., $w_2$ as described with reference to FIG. 2) associated with throughput. In some other examples, the second signaling may indicate multiple candidate sets of one or more LCP parameters associated with each data flow of the multiple data flows, In some cases, at 410, the UE 115-*b* may receive, from the network entity 105-*b*, a packet error rate (PER) associated with each data flow of the multiple data flows.

At 415, the UE 115-*b* may calculate a DM associated with a transmission time of each data flow. In some cases, the UE 115-*b* may calculate the DM associated with the transmission time of each data flow based on a PDB, a throughput, a payload size, a quantity of bits, or any combination thereof. That is, the UE 115-*b* may calculate the DM associated with a transmission time of a first data flow of the multiple data flows based on a PDB, a throughput, a payload size, a quantity of bits, or any combination thereof, associated with the first data flow. Additionally, or alternatively, the UE 115-*b* may calculate a time duration (e.g., a time 310 in the context of FIGS. 3A and 3B) to flush a buffer associated with each data flow based on the throughput and the quantity of bits, where the DM associated with the transmission time of each data flow is based on the time duration (e.g., threshold) to flush the buffer. For example, the UE 115-*b* may calculate a time duration to flush a buffer associated with the first data flow based on the throughput and the quantity of bits associated with the first data flow. Additionally, or alternatively, the UE 115-*b* may calculate the DM based on the first scaling parameter associated with PDB, the PDB, the second scaling parameter associated with throughput, and the throughput. Additionally, or alternatively, the UE 115-*b* may calculate the DM associated with the transmission time of each data flow based on the PER associated with each data flow. For example, the UE 115-*b* may consider the PER in the calculation of the time duration to flush the buffer associated with each data flow. In other words, a data flow may be associated with a high PER such that the UE 115-*b* may retransmit one or more portions of the data flow (e.g., for successful transmission of the data flow) and the UE 115-*b* may include the time (e.g., duration) associated with retransmitting the one or more portions in the calculation of the associated time duration.

At 420, the UE 115-*b* may adapt the set of one or more LCP parameters associated with one or more data flows of the multiple data flows based on the DM associated with each data flow of the multiple data flows. Examples of LCP parameters that the UE 115-*b* may adapt for a data flow of the multiple data flows include a priority of the data flow, a PBR of the data flow, a BSD of the data flow, or any combination thereof. In some examples, the UE 115-*b* may adapt a priority associated with each of the one or more data flows of the multiple data flows based on the respective DMs associated with each of the one or more data flows, where the set of one or more logical channel prioritization parameters includes the priority. For example, the UE 115-*b* may adapt a priority of the first data flow to be greater than a priority of the second data flow based on a DM associated with the first data flow being greater than a DM associated with the second data flow. That is, the UE 115-*b* may decrease a priority value of the first data flow to be less than a priority value of the second data flow, such that the first data flow has a greater priority than the second data flow (e.g., due to lower priority values being associated with higher priority). In such cases, the UE 115-*b* may prioritize the first data flow over the second data flow based on the priority of the first data flow being greater than the priority of the second data flow.

Additionally, or alternatively, the UE 115-*b* may adapt a PBR associated with each of the one or more data flows of the multiple data flows based on the respective DMs associated with each of the one or more data flows. For example, the UE 115-*b* may adapt a PBR associated with the first data flow to be greater than a PBR associated with the second data flow, where the PBR associated with each data flow is associated with a data rate provided to the respective data flow prior to allocating resources to a lower priority data flow (e.g., logical channel). As such, the UE 115-*b* may increase the PBR associated with the first data flow to be greater than the PBR associated with the second data flow, such that the UE 115-*b* provides a higher data rate to the first data flow, resulting in a larger portion of the first data flow being allocated resources (e.g., as compared to the second data flow, as compared to a PBR associated with the first data flow prior to adaptation, or both). For example, the UE 115-*b* may adapt the PBR associated with the first data flow to be infinity, such that the UE 115-*b* may allocate resources for all the data associated with the first data flow (e.g., for transmission of the first data flow via the associated logical channel) prior to allocating resources for the second data flow. Additionally, or alternatively, increasing the PBR associated with the first data flow may result in a value of $B_j$ associated with the first data flow being incremented (e.g., for each TTI) at a higher rate if no resources are allocated to the first data flow for a given TTI (e.g., as compared to the second data flow, as compared to a rate of incrementing associated with the first data flow prior to adaptation, or both).

Additionally, or alternatively, the UE 115-*b* may adapt a BSD associated with each of the one or more data flows of the multiple data flows based on the respective DMs associated with each of the one or more data flows. For example, the UE 115-*b* may adapt a BSD associated with the first data flow to be less than a BSD associated with the second data flow. As such, a threshold value (e.g., maximum value) of the value of $B_j$ associated with the first data flow may be less than a threshold value (e.g., maximum value) of the value of $B_j$ associated with the second data flow.

In some examples, the UE 115-*b* may adapt the set of one or more LCP parameters associated with the one or more data flows of the multiple data flows by selecting the set of one or more logical channels LCP parameters from the multiple candidate sets of one or more LCP parameters.

In some cases, at 425, the UE 115-*b* may transmit, to the network entity 105-*b*, an indication of the adapted set of one or more LCP parameters associated with the one or more data flows of the multiple data flows.

At 430, the UE 115-*b* may transmit one or more of the data flows based on the adapting. That is, the UE 115-*b* may transmit the first data flow of the multiple data flows based on a prioritization of the first data flow over a second data flow of the multiple data flows, where the prioritization is based on the adapting. In some examples, the first data flow may arrive at a buffer associated with the UE 115-*b* before or at a same time that the second data flow arrives at the buffer associated with the UE 115-*b*. In such cases, the UE 115-*b* may transmit the second data flow of the multiple data flows after completing transmission of the first data flow of the multiple data flows. In some other examples, the first data flow may arrive at the buffer associated with the UE 115-*b* after the second data flow arrives at the buffer associated with the UE 115-*b*. In such cases, the UE 115-*b* may transmit a first portion of the second data flow (e.g., prior to transmitting the first data flow) and transmit a second portion of the second data flow after completing transmission of the first data flow, where the second data flow includes the first portion and the second portion. In other words, the UE 115-*b* may pause transmission of the second data flow to transmit the first data flow.

Figure 5:
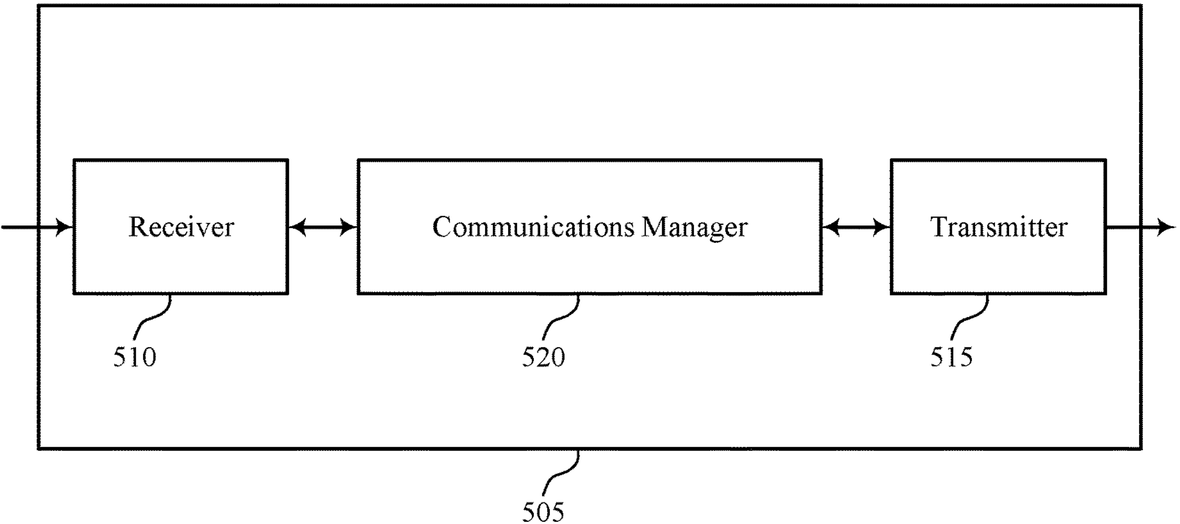
FIGS. 5 and 6 illustrate block diagrams of devices that support LCP adaptation in accordance with one or more aspects of the present disclosure.

FIG. 5 illustrates a block diagram 500 of a device 505 that supports LCP adaptation in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to LCP adaptation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to LCP adaptation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of LCP adaptation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving signaling scheduling a set of multiple data flows associated with a set of channels, where each data flow of the set of multiple data flows is associated with a set of one or more CP parameters. The communications manager 520 may be configured as or otherwise support a means for calculating a DM associated with a transmission time of each data flow based at least in part on the sets of one or more CP parameters. The communications manager 520 may be configured as or otherwise support a means for adapting the set of one or more LCP parameters associated with at least one data flow of the set of multiple data flows based on the DM. The communications manager 520 may be configured as or otherwise support a means for transmitting a first data flow of the set of multiple data flows based on a prioritization of the first data flow over a second data flow of the set of multiple data flows, where the prioritization is based on the adapting.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for adaptive LCP which may result in reduced processing, reduced power consumption, and more efficient utilization of communication resources, among other advantages.

Figure 6:
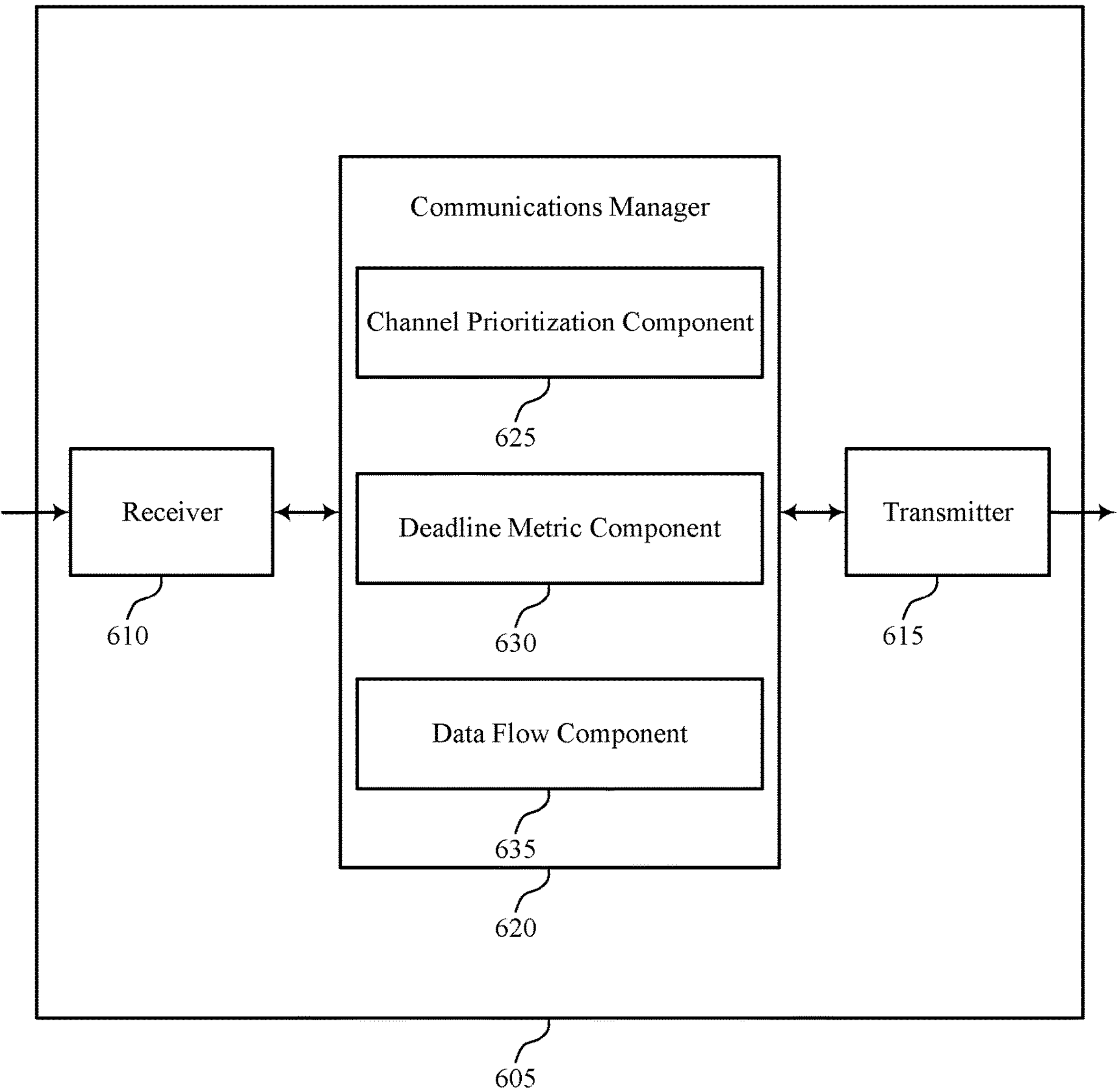

FIG. 6 illustrates a block diagram 600 of a device 605 that supports LCP adaptation in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to LCP adaptation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to LCP adaptation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of LCP adaptation as described herein. For example, the communications manager 620 may include a CP component 625, a DM component 630, a data flow component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The CP component 625 may be configured as or otherwise support a means for receiving signaling scheduling a set of multiple data flows associated with a set of channels, where each data flow of the set of multiple data flows is associated with a set of one or more CP parameters. The DM component 630 may be configured as or otherwise support a means for calculating a DM associated with a transmission time of each data flow based on the sets of one or more CP parameters. The CP component 625 may be configured as or otherwise support a means for adapting the set of one or more CP parameters associated with at least one data flow of the set of multiple data flows based on the DM. The data flow component 635 may be configured as or otherwise support a means for transmitting a first data flow of the set of multiple data flows based on a prioritization of the first data flow over a second data flow of the set of multiple data flows, where the prioritization is based on the adapting.

Figure 7:
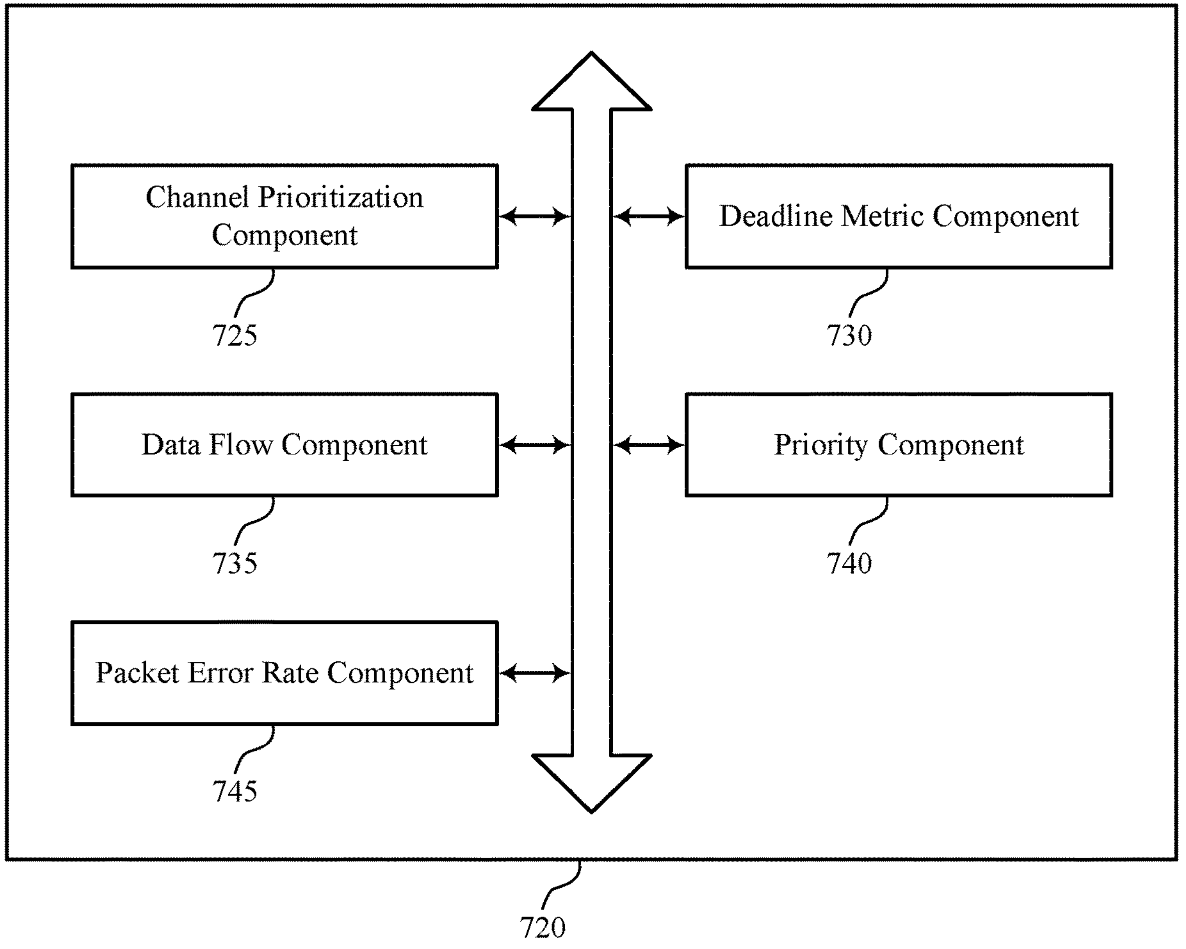
FIG. 7 illustrates a block diagram of a communications manager that supports LCP adaptation in accordance with one or more aspects of the present disclosure.

FIG. 7 illustrates a block diagram 700 of a communications manager 720 that supports LCP adaptation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of LCP adaptation as described herein. For example, the communications manager 720 may include a CP component 725, a DM component 730, a data flow component 735, a priority component 740, a PER component 745, or any combination thereof. Each of these components may communicate, directly or indirectly, with one another (e.g., via one or more buses).

The communications manager 720 may support wireless communications at a UE in accordance with examples as disclosed herein. The CP component 725 may be configured as or otherwise support a means for receiving signaling scheduling a set of multiple data flows associated with a set of channels, where each data flow of the set of multiple data flows is associated with a set of one or more CP parameters. The DM component 730 may be configured as or otherwise support a means for calculating a DM associated with a transmission time of each data flow based on the sets of one or more CP parameters. In some examples, the CP component 725 may be configured as or otherwise support a means for adapting the set of one or more CP parameters associated with at least one data flow of the set of multiple data flows based on the DM. The data flow component 735 may be configured as or otherwise support a means for transmitting a first data flow of the set of multiple data flows based on a prioritization of the first data flow over a second data flow of the set of multiple data flows, where the prioritization is based on the adapting.

In some examples, to support calculating the DM associated with the transmission time of each data flow, the DM component 730 may be configured as or otherwise support a means for calculating the DM associated with the transmission time of each data flow based on a PDB, a throughput, a payload size, a quantity of bits, or any combination thereof.

In some examples, to support calculating the DM associated with the transmission time of each data flow, the DM component 730 may be configured as or otherwise support a means for calculating a time duration to flush a buffer associated with each data flow based on the throughput and the quantity of bits, where the DM associated with the transmission time of each data flow is based on the time duration to flush the buffer.

In some examples, to support calculating the DM associated with the transmission time of each data flow, the DM component 730 may be configured as or otherwise support a means for calculating the DM based on a first scaling parameter associated with PDB, the PDB, a second scaling parameter associated with throughput, and the throughput.

In some examples, to support calculating the DM associated with the transmission time of each data flow, the DM component 730 may be configured or otherwise support a means for calculating the DM as a weighted sum of reciprocals of the packet delay budget and the throughput, wherein the weighted sum is based on the first scaling parameter associated with the PDB and the second scaling parameter associated with throughput.

In some examples, the first data flow arrives at a buffer associated with the UE before or at a same time that the second data flow arrives at the buffer associated with the UE, and the data flow component 735 may be configured as or otherwise support a means for transmitting the second data flow of the set of multiple data flows after completing transmission of the first data flow of the set of multiple data flows.

In some examples, the first data flow arrives at a buffer associated with the UE after the second data flow arrives at the buffer associated with the UE, and the data flow component 735 may be configured as or otherwise support a means for transmitting a first portion of the second data flow of the set of multiple data flows. In some examples, the first data flow arrives at a buffer associated with the UE after the second data flow arrives at the buffer associated with the UE, and the data flow component 735 may be configured as or otherwise support a means for transmitting a second portion of the second data flow of the set of multiple data flows after completing transmission of the first data flow of the set of multiple data flows.

In some examples, to support adapting the set of one or more CP parameters associated with the at least one data flow of the set of multiple data flows, the priority component 740 may be configured as or otherwise support a means for adapting a priority associated with each data flow of the at least one data flow based at least in part on the respective DM associated with each data flow of the at least one data flow, where the set of one or more CP parameters includes the priority.

In some examples, to support adapting the priority associated with the at least one data flow of the set of multiple data flows, the priority component 740 may be configured as or otherwise support a means for adapting a priority of the first data flow to be higher than a priority of the second data flow based on the DM associated with the first data flow being higher than the DM associated with the second data flow, where prioritizing the first data flow over the second data flow is based on the priority of the first data flow being higher than the priority of the second data flow.

In some examples, the CP component 725 may be configured as or otherwise support a means for receiving signaling indicating the set of one or more CP parameters associated with each data flow of the set of multiple data flows.

In some examples, the set of one or more CP parameters associated with each data flow of the set of multiple data flows includes one or more scaling parameters associated with one or more QoS parameters, including at least a first scaling parameter associated with PDB and a second scaling parameter associated with throughput.

In some examples, the CP component 725 may be configured as or otherwise support a means for receiving signaling indicating a set of multiple candidate sets of one or more CP parameters associated with each data flow of the set of multiple data flows, where adapting the set of one or more CP parameters associated with the at least one data flow of the set of multiple data flows includes selecting the set of one or more CP parameters from the set of multiple candidate sets of one or more CP parameters.

In some examples, the CP component 725 may be configured as or otherwise support a means for transmitting an indication of the adapted set of one or more CP parameters associated with the at least one data flow of the set of multiple data flows.

In some examples, the set of one or more LCP parameters includes a priority, a prioritized bit rate, a BSD, or any combination thereof.

In some examples, the PER component 745 may be configured as or otherwise support a means for receiving an indication of a PER associated with each data flow of the set of multiple data flows, where calculating the DM associated with the transmission time of each data flow is based on the respective PER.

Figure 8:
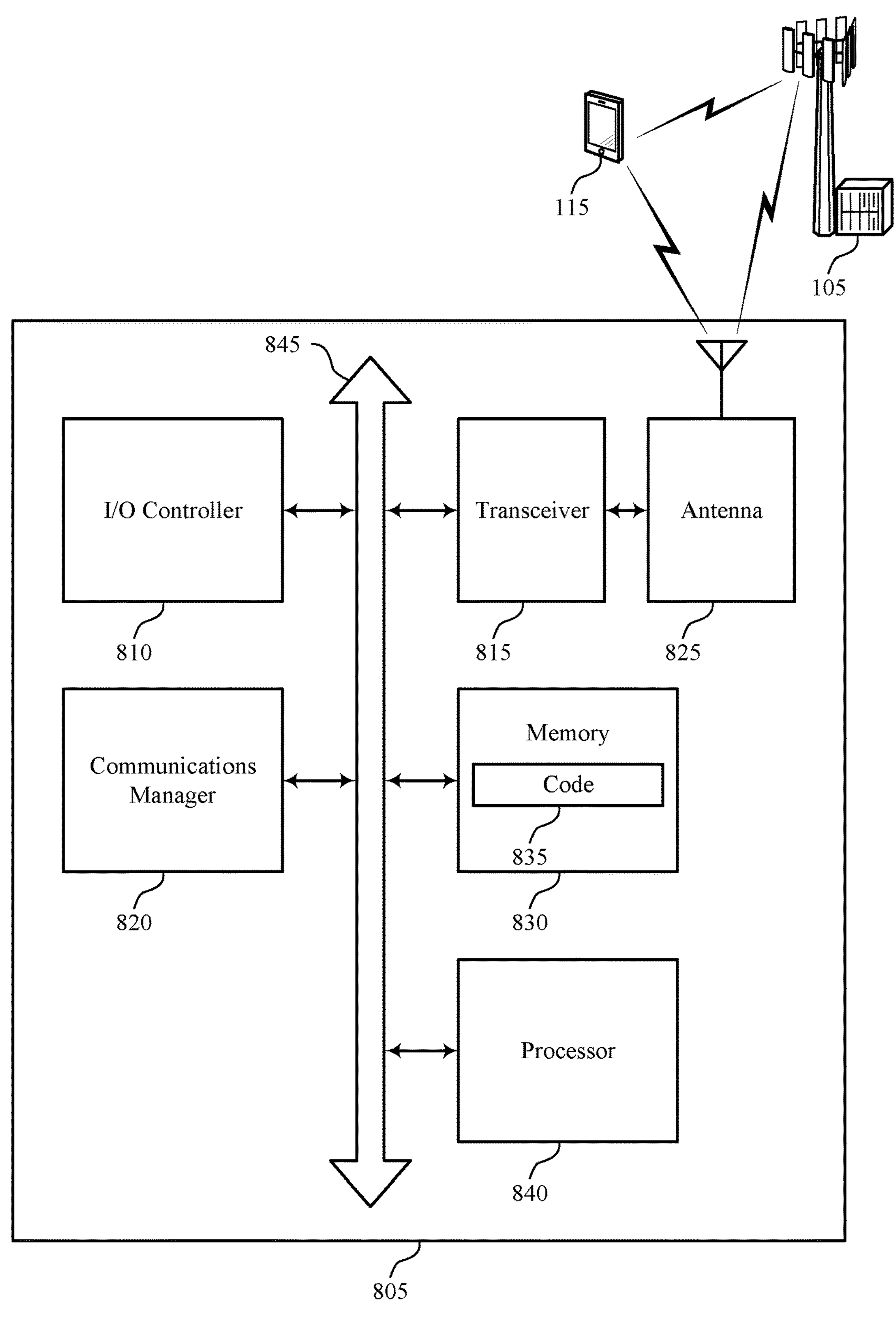
FIG. 8 illustrates a diagram of a system including a device that supports LCP adaptation in accordance with one or more aspects of the present disclosure.

FIG. 8 illustrates a diagram of a system 800 including a device 805 that supports LCP adaptation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting LCP adaptation). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving signaling scheduling a set of multiple data flows associated with a set of channels, where each data flow of the set of multiple data flows is associated with a set of one or more CP parameters. The communications manager 820 may be configured as or otherwise support a means for calculating a DM associated with a transmission time of each data flow based on the sets of one or more CP parameters. The communications manager 820 may be configured as or otherwise support a means for adapting the set of one or more CP parameters associated with at least one data flow flows of the set of multiple data flows based on the DM. The communications manager 820 may be configured as or otherwise support a means for transmitting a first data flow of the set of multiple data flows based on a prioritization of the first data flow over a second data flow of the set of multiple data flows, where the prioritization is based on the adapting.

By including or configuring the communications manager 820 in accordance with examples as described herein, the device 805 may support techniques for adaptive LCP which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of LCP adaptation as described herein, or the processor 840 and the memory 830 may be otherwise configured to perform or support such operations.

Figure 9:
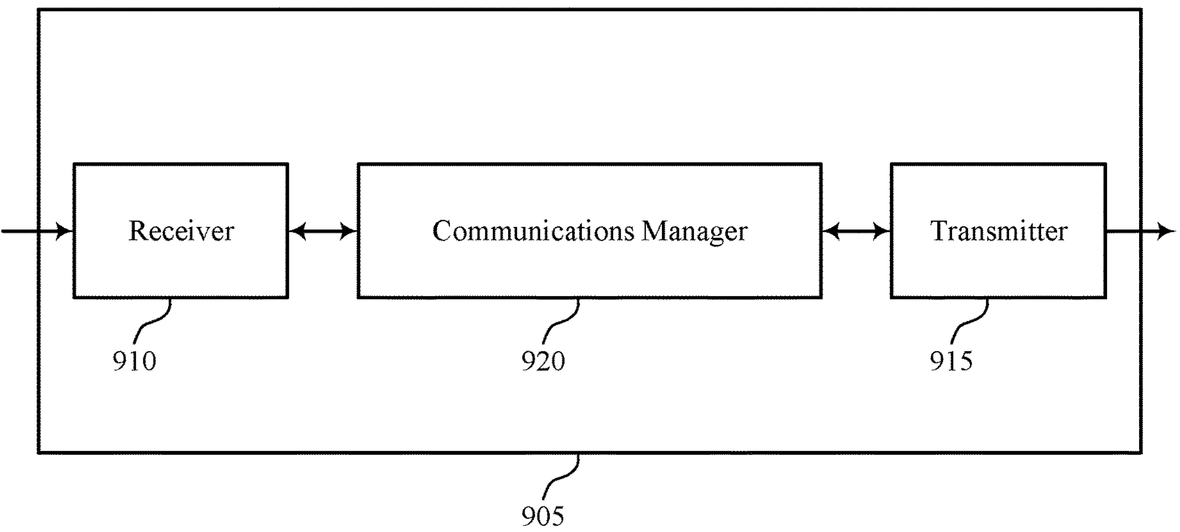
FIGS. 9 and 10 illustrate block diagrams of devices that support LCP adaptation in accordance with one or more aspects of the present disclosure.
Figure 9:

FIG. 9 illustrates a block diagram 900 of a device 905 that supports LCP adaptation in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of LCP adaptation as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting signaling scheduling a set of multiple data flows associated with a set of channels, where each data flow of the set of multiple data flows is associated with a set of one or more CP parameters. The communications manager 920 may be configured as or otherwise support a means for receiving an indication of one or more adapted sets of one or more CP parameters associated with at least one data flow of the set of multiple data flows.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for adaptive LCP which may result in reduced processing, reduced power consumption, and more efficient utilization of communication resources, among other advantages.

Figure 10:
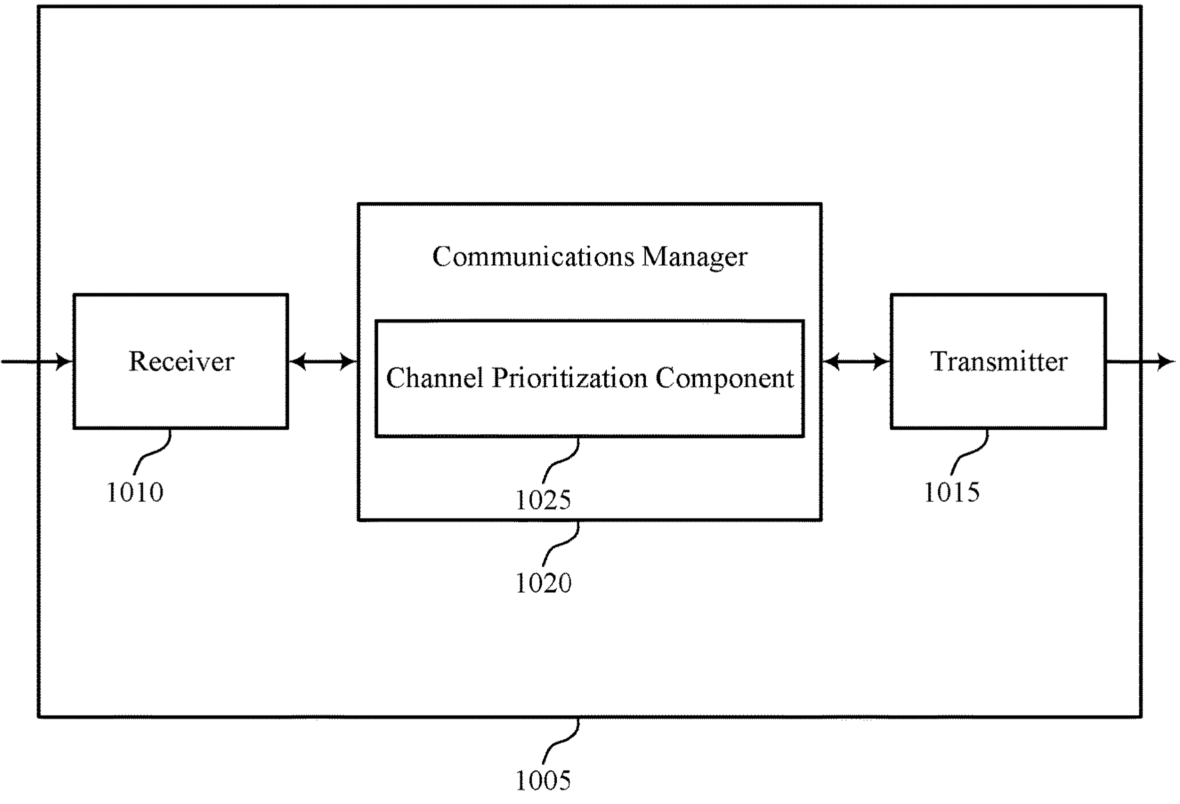

FIG. 10 illustrates a block diagram 1000 of a device 1005 that supports LCP adaptation in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of LCP adaptation as described herein. For example, the communications manager 1020 may include a logical channel prioritization component 1025, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The logical channel prioritization component 1025 may be configured as or otherwise support a means for transmitting signaling scheduling a set of multiple data flows associated with a set of channels, where each data flow of the set of multiple data flows is associated with a set of one or more CP parameters. The logical channel prioritization component 1025 may be configured as or otherwise support a means for receiving an indication of one or more adapted sets of one or more CP parameters associated with at least one data flow of the set of multiple data flows.

Figure 11:
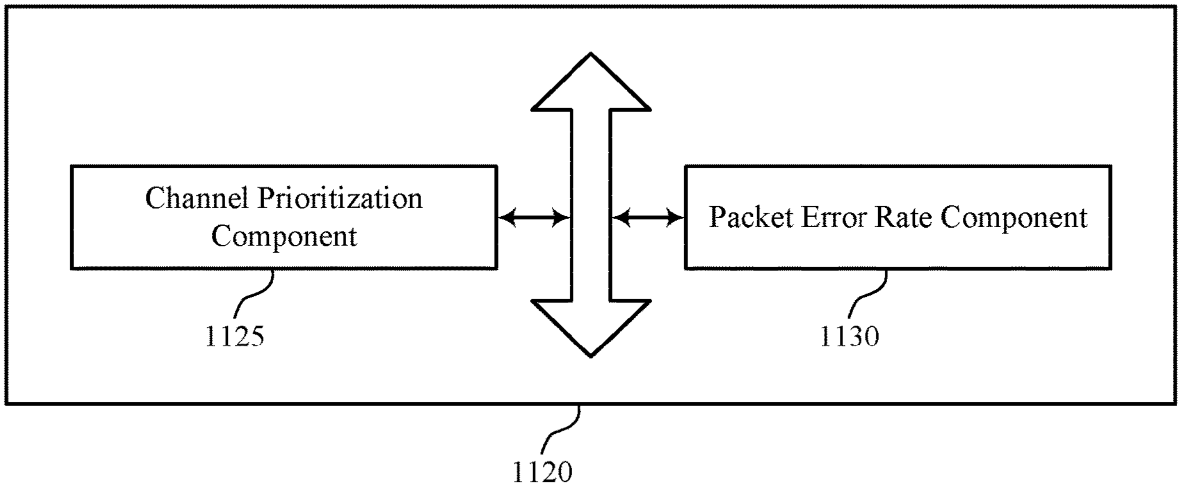
FIG. 11 illustrates a block diagram of a communications manager that supports LCP adaptation in accordance with one or more aspects of the present disclosure.

FIG. 11 illustrates a block diagram 1100 of a communications manager 1120 that supports LCP adaptation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of LCP adaptation as described herein. For example, the communications manager 1120 may include a CP component 1125 a PER component 1130, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The CP component 1125 may be configured as or otherwise support a means for transmitting signaling scheduling a set of multiple data flows associated with a set of channels, where each data flow of the set of multiple data flows is associated with a set of one or more CP parameters. In some examples, the CP component 1125 may be configured as or otherwise support a means for receiving an indication of one or more adapted sets of one or more CP parameters associated with at least one data flow of the set of multiple data flows.

In some examples, the CP component 1125 may be configured as or otherwise support a means for transmitting signaling indicating the set of one or more CP parameters associated with each data flow of the set of multiple data flows for triggering a UE to adapt the sets of one or more channel prioritization parameters associated with each data flow of the plurality of data flows based at least in part on a DM associated with a transmission time of each data flow.

In some examples, the set of one or more CP parameters associated with each data flow of the set of multiple data flows includes one or more scaling parameters associated with one or more QoS parameters, including at least a first scaling parameter associated with PDB and a second scaling parameter associated with throughput.

In some examples, the CP component 1125 may be configured as or otherwise support a means for transmitting signaling indicating a set of multiple candidate sets of one or more CP parameters associated with each data flow of the set of multiple data flows, where the set of multiple candidate sets of CP parameters associated with the at least one data flow of the set of multiple data flows flow includes the one or more adapted sets of one or more CP parameters associated with the at least one data flow of the set of multiple data flows.

In some examples, the set of one or more CP parameters includes a priority, a prioritized bit rate, a BSD, or any combination thereof.

In some examples, the PER component 1130 may be configured as or otherwise support a means for transmitting an indication of a PER associated with each data flow of the set of multiple data flows, where the DM associated with the transmission time of each data flow is based on the respective PER.

Figure 12:
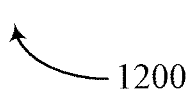
FIG. 12 illustrates a diagram of a system including a device that supports LCP adaptation in accordance with one or more aspects of the present disclosure.

FIG. 12 illustrates a diagram of a system 1200 including a device 1205 that supports LCP adaptation in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting LCP adaptation). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting signaling scheduling a set of multiple data flows associated with a set of channels, where each data flow of the set of multiple data flows is associated with a set of one or more CP parameters. The communications manager 1220 may be configured as or otherwise support a means for receiving an indication of one or more adapted sets of one or more CP parameters associated with at least one data flow of the set of multiple data flows.

By including or configuring the communications manager 1220 in accordance with examples as described herein, the device 1205 may support techniques for adaptive LCP which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of LCP adaptation as described herein, or the processor 1235 and the memory 1225 may be otherwise configured to perform or support such operations.

Figure 13:
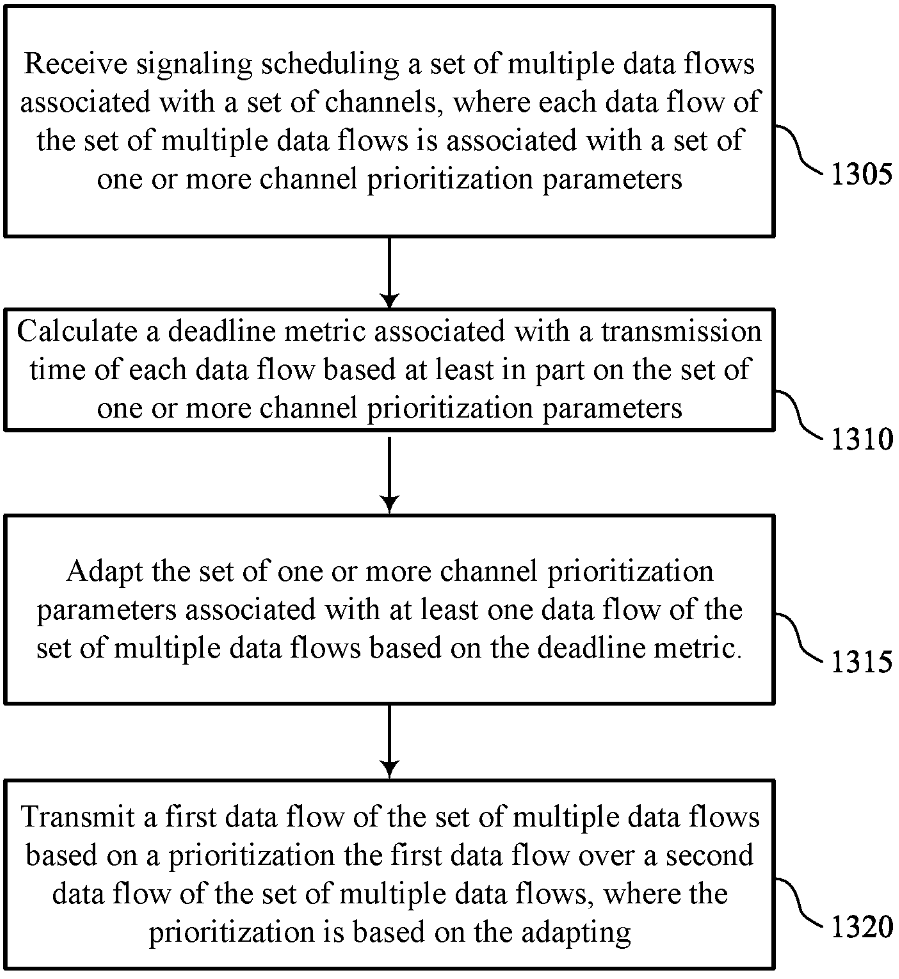

FIG. 13 illustrates a flowchart illustrating a method 1300 that supports LCP adaptation in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving signaling scheduling a set of multiple data flows associated with a set of channels, where each data flow of the set of multiple data flows is associated with a set of one or more CP parameters. The operations of 1305 may be performed in accordance with examples as disclosed herein. In some examples, aspects of the operations of 1305 may be performed by a CP component 725 as described with reference to FIG. 7.

At 1310, the method may include calculating a DM associated with a transmission time of each data flow based on the sets of one or more CP parameters. The operations of 1310 may be performed in accordance with examples as disclosed herein. In some examples, aspects of the operations of 1310 may be performed by a DM component 730 as described with reference to FIG. 7.

At 1315, the method may include adapting the set of one or more CP parameters associated with at least one data flow of the set of multiple data flows based on the DM. The operations of 1315 may be performed in accordance with examples as disclosed herein. In some examples, aspects of the operations of 1315 may be performed by a CP component 725 as described with reference to FIG. 7.

At 1320, the method may include transmitting a first data flow of the set of multiple data flows based on a prioritization of the first data flow over a second data flow of the set of multiple data flows, where the prioritization is based on the adapting. The operations of 1320 may be performed in accordance with examples as disclosed herein. In some examples, aspects of the operations of 1320 may be performed by a data flow component 735 as described with reference to FIG. 7.

Figure 14:
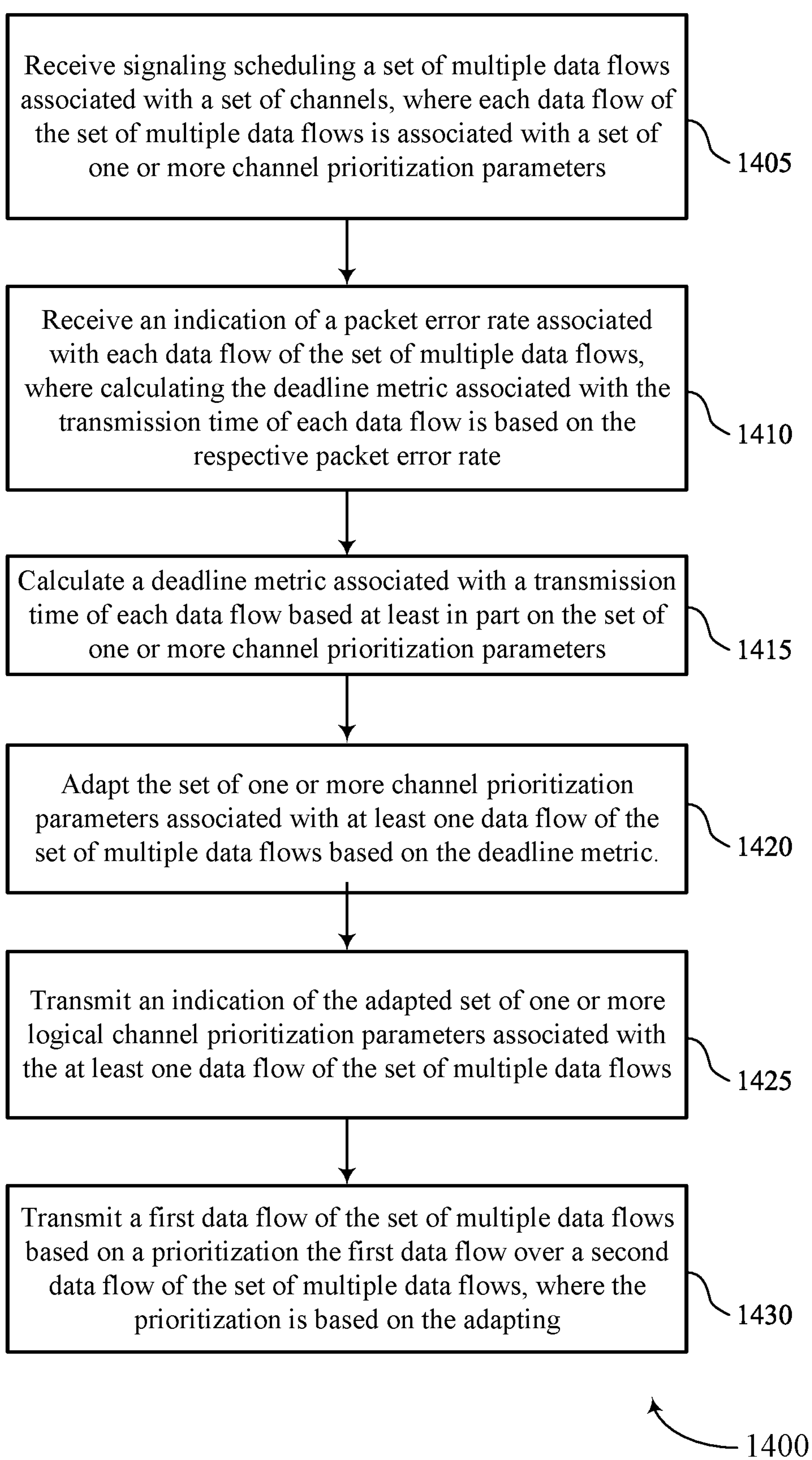

FIG. 14 illustrates a flowchart illustrating a method 1400 that supports LCP adaptation in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving signaling scheduling a set of multiple data flows associated with a set of channels, where each data flow of the set of multiple data flows is associated with a set of one or more CP parameters. The operations of 1405 may be performed in accordance with examples as disclosed herein. In some examples, aspects of the operations of 1405 may be performed by a CP component 725 as described with reference to FIG. 7.

At 1410, the method may include receiving an indication of a PER associated with each data flow of the set of multiple data flows, where calculating the DM associated with the transmission time of each data flow is based on the respective PER. The operations of 1410 may be performed in accordance with examples as disclosed herein. In some examples, aspects of the operations of 1410 may be performed by a PER component 745 as described with reference to FIG. 7.

At 1415, the method may include calculating a DM associated with a transmission time of each data flow based on the sets of one or more CP parameters. The operations of 1415 may be performed in accordance with examples as disclosed herein. In some examples, aspects of the operations of 1415 may be performed by a DM component 730 as described with reference to FIG. 7.

At 1420, the method may include adapting the set of one or more CP parameters associated with at least one data flow of the set of multiple data flows based on the DM. The operations of 1420 may be performed in accordance with examples as disclosed herein. In some examples, aspects of the operations of 1420 may be performed by a CP component 725 as described with reference to FIG. 7.

At 1425, the method may include transmitting an indication of the adapted set of one or more CP parameters associated with the at least one data flow of the set of multiple data flows. The operations of 1425 may be performed in accordance with examples as disclosed herein. In some examples, aspects of the operations of 1425 may be performed by a CP component 725 as described with reference to FIG. 7.

At 1430, the method may include transmitting a first data flow of the set of multiple data flows based on a prioritization of the first data flow over a second data flow of the set of multiple data flows, where the prioritization is based on the adapting. The operations of 1430 may be performed in accordance with examples as disclosed herein. In some examples, aspects of the operations of 1430 may be performed by a data flow component 735 as described with reference to FIG. 7.

FIG. 15 illustrates a flowchart illustrating a method 1500 that supports LCP adaptation in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting signaling scheduling a set of multiple data flows associated with a set of channels, where each data flow of the set of multiple data flows is associated with a set of one or more CP parameters. The operations of 1505 may be performed in accordance with examples as disclosed herein. In some examples, aspects of the operations of 1505 may be performed by a CP component 1125 as described with reference to FIG. 11.

At 1510, the method may include receiving an indication of one or more adapted sets of one or more CP parameters associated with at least one data flow of the set of multiple data flows. The operations of 1510 may be performed in accordance with examples as disclosed herein. In some examples, aspects of the operations of 1510 may be performed by a CP component 1125 as described with reference to FIG. 11.

The following provides an overview of aspects of the present disclosure:

Aspect 1: A method for wireless communications at a UE, comprising: receiving signaling scheduling a plurality of data flows associated with a set of channels, wherein each data flow of the plurality of data flows is associated with a set of one or more CP parameters; calculating a DM associated with a transmission time of each data flow based at least in part on the sets of one or more CP parameters; adapting the set of one or more CP parameters associated with at least one data flow of the plurality of data flows based at least in part on the DM; and transmitting a first data flow of the plurality of data flows based at least in part on a prioritization of the first data flow over a second data flow of the plurality of data flows, wherein the prioritization is based at least in part on the adapting.

Aspect 2: The method of aspect 1, wherein calculating the DM associated with the transmission time of each data flow comprises: calculating the DM associated with the transmission time of each data flow based at least in part on a PDB, a throughput, a payload size, a quantity of bits, or any combination thereof.

Aspect 3: The method of aspect 2, wherein calculating the DM associated with the transmission time of each data flow comprises: calculating a time duration to flush a buffer associated with each data flow based at least in part on the throughput and the quantity of bits, wherein the DM associated with the transmission time of each data flow is based at least in part on the time duration to flush the buffer.

Aspect 4: The method of any of aspects 2 through 3, wherein calculating the DM associated with the transmission time of each data flow comprises: calculating the DM based at least in part on a first scaling parameter associated with PDB, the PDB, a second scaling parameter associated with throughput, and the throughput.

Aspect 5: The method of aspect 4, wherein calculating the DM associated with the transmission time of each data flow comprises: calculating the DM as a weighted sum of reciprocals of the packet delay budget and the throughput, wherein the weighted sum is based on the first scaling parameter associated with the PDB and the second scaling parameter associated with throughput.

Aspect 6: The method of any of aspects 1 through 5, wherein the first data flow arrives at a buffer associated with the UE before or at a same time that the second data flow arrives at the buffer associated with the UE, the method further comprising: transmitting the second data flow of the plurality of data flows after completing transmission of the first data flow of the plurality of data flows.

Aspect 7: The method of any of aspects 1 through 5, wherein the first data flow arrives at a buffer associated with the UE after the second data flow arrives at the buffer associated with the UE, the method further comprising: transmitting a first portion of the second data flow of the plurality of data flows; and transmitting a second portion of the second data flow of the plurality of data flows after completing transmission of the first data flow of the plurality of data flows.

Aspect 8: The method of any of aspects 1 through 7, wherein adapting the set of one or more CP parameters associated with the at least one data flow of the plurality of data flows comprises: adapting a priority associated with each data flow of the at least one data flow based at least in part on the respective DM associated with each data flow of the at least one data flow, wherein the set of one or more CP parameters comprises the priority.

Aspect 9: The method of aspect 8, wherein adapting the priority associated with the at least one data flow of the plurality of data flows comprises: adapting a priority of the first data flow to be higher than a priority of the second data flow based at least in part on the DM associated with the first data flow being higher than the DM associated with the second data flow, wherein prioritizing the first data flow over the second data flow is based at least in part on the priority of the first data flow being higher than the priority of the second data flow.

Aspect 10: The method of any of aspects 1 through 9, further comprising: receiving signaling indicating the set of one or more CP parameters associated with each data flow of the plurality of data flows.

Aspect 11: The method of aspect 10, wherein the set of one or more CP parameters associated with each data flow of the plurality of data flows comprises one or more scaling parameters associated with one or more QoS parameters, including at least a first scaling parameter associated with PDB and a second scaling parameter associated with throughput.

Aspect 12: The method of any of aspects 1 through 9, further comprising: receiving signaling indicating a plurality of candidate sets of one or more CP parameters associated with each data flow of the plurality of data flows, wherein adapting the set of one or more CP parameters associated with the at least one data flow of the plurality of data flows comprises selecting the set of one or more CP parameters from the plurality of candidate sets of one or more CP parameters.

Aspect 13: The method of any of aspects 1 through 12, further comprising: transmitting an indication of the adapted set of one or more CP parameters associated with the at least one data flow of the plurality of data flows.

Aspect 14: The method of any of aspects 1 through 13, wherein the set of one or more CP parameters comprises a priority, a PBR, a BSD, or any combination thereof.

Aspect 15: The method of any of aspects 1 through 14, further comprising: receiving an indication of a PER associated with each data flow of the plurality of data flows, wherein calculating the DM associated with the transmission time of each data flow is based at least in part on the respective PER.

Aspect 16: A method for wireless communications at a network entity, comprising: transmitting signaling scheduling a plurality of data flows associated with a set of logical channels, wherein each data flow of the plurality of data flows is associated with a set of one or more CP parameters; and receiving an indication of one or more adapted sets of one or more CP parameters associated with at least one data flow of the plurality of data flows.

Aspect 17: The method of aspect 16, further comprising: transmitting signaling indicating the set of one or more CP parameters associated with each data flow of the plurality of data flows for triggering a user equipment (UE) to adapt the sets of one or more CP parameters associated with each data flow of the plurality of data flows based at least in part on a deadline metric associated with a transmission time of each data flow.

Aspect 18: The method of aspect 17, wherein the set of one or more CP parameters associated with each data flow of the plurality of data flows comprises one or more scaling parameters associated with one or more QoS parameters, including at least a first scaling parameter associated with PDB and a second scaling parameter associated with throughput.

Aspect 19: The method of aspect 16, further comprising: transmitting signaling indicating a plurality of candidate sets of one or more CP parameters associated with each data flow of the plurality of data flows, wherein the plurality of candidate sets of CP parameters associated with the at least one data flow of the plurality of data flows flow comprises the one or more adapted sets of one or more CP parameters associated with the at least one data flow of the plurality of data flows.

Aspect 20: The method of any of aspects 16 through 19, wherein the set of one or more CP parameters comprises a priority, a PBR, a BSD, or any combination thereof.

Aspect 21: The method of aspect 20, further comprising: transmitting an indication of a PER associated with each data flow of the plurality of data flows, wherein the DM associated with the transmission time of each data flow is based at least in part on the respective PER.

Aspect 22: An apparatus for wireless communications at a UE, comprising a processor; memory coupled with the processor; and instructions stored in the memory and executable by the processor to cause the apparatus to perform a method of any of aspects 1 through 15.

Aspect 23: An apparatus for wireless communications at a UE, comprising at least one means for performing a method of any of aspects 1 through 15.

Aspect 24: A non-transitory computer-readable medium storing code for wireless communications at a UE, the code comprising instructions executable by a processor to perform a method of any of aspects 1 through 15.

Aspect 25: An apparatus for wireless communications at a network entity, comprising a processor; memory coupled with the processor; and instructions stored in the memory and executable by the processor to cause the apparatus to perform a method of any of aspects 16 through 21.

Aspect 26: An apparatus for wireless communications at a network entity, comprising at least one means for performing a method of any of aspects 16 through 21.

Aspect 27: A non-transitory computer-readable medium storing code for wireless communications at a network entity, the code comprising instructions executable by a processor to perform a method of any of aspects 16 through 21.

Aspect 28: A computer program comprising code for wireless communications that, when executed on a processor, cause the processor to perform a method of any of aspects 1 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

one or more processors;

one or more memories coupled with the one or more processors; and instructions stored in the one or more memories and executable by the one or more processors to cause the apparatus to:

receive, from a network entity, signaling scheduling a plurality of data flows associated with a set of channels, wherein each data flow of the plurality of data flows is associated with a respective set of one or more channel prioritization parameters;

calculate a respective deadline metric for each data flow of the plurality of data flows based at least in part on a respective packet delay budget of a corresponding data flow, a respective throughput of the corresponding data flow, and a respective quantity of bits of the corresponding data flow, each deadline metric associated with a respective transmission time of the corresponding data flow and calculated based at least in part on the respective set of one or more channel prioritization parameters of the corresponding data flow;

adapt the respective set of one or more channel prioritization parameters associated with at least one data flow of the plurality of data flows based at least in part on the respective deadline metric of the at least one data flow; and transmit, to the network entity, a first data flow of the plurality of data flows based at least in part on a prioritization of the first data flow over a second data flow of the plurality of data flows, wherein the prioritization is based at least in part on the adapting.

2. The apparatus of claim 1, wherein the instructions to calculate the respective deadline metric for each data flow are executable by the one or more processors to cause the apparatus to:

calculate a first deadline metric for the first data flow based at least in part on a first packet delay budget, a first throughput, a first payload size, a first quantity of bits, or any combination thereof, of the first data flow.

3. The apparatus of claim 2, wherein the instructions to calculate the respective deadline metric for each data flow are executable by the one or more processors to cause the apparatus to:

calculate a time duration to flush a buffer associated with the first data flow based at least in part on the first throughput and the first quantity of bits, wherein the first deadline metric is based at least in part on the time duration to flush the buffer.

4. The apparatus of claim 2, wherein the instructions to calculate the respective deadline metric for each data flow are executable by the one or more processors to cause the apparatus to:

calculate the first deadline metric based at least in part on a first scaling parameter associated with the first packet delay budget, the first packet delay budget, a second scaling parameter associated with the first throughput, and the first throughput.

5. The apparatus of claim 1, wherein the first data flow arrives at a buffer associated with the UE before or at a same time that the second data flow arrives at the buffer associated with the UE, and the instructions are further executable by the one or more processors to cause the apparatus to:

transmit the second data flow of the plurality of data flows after completing transmission of the first data flow of the plurality of data flows.

6. The apparatus of claim 1, wherein the first data flow arrives at a buffer associated with the UE after the second data flow arrives at the buffer associated with the UE, and the instructions are further executable by the one or more processors to cause the apparatus to:

transmit a first portion of the second data flow of the plurality of data flows; and transmit a second portion of the second data flow of the plurality of data flows after completing transmission of the first data flow of the plurality of data flows.

7. The apparatus of claim 1, wherein the instructions to adapt the respective set of one or more channel prioritization parameters associated with each data flow of the at least one data flow of the plurality of data flows are executable by the one or more processors to cause the apparatus to:

adapt a respective priority associated with each data flow of the at least one data flow based at least in part on the respective deadline metric associated with each data flow of the at least one data flow, wherein the respective set of one or more channel prioritization parameters comprises the respective priority.

8. The apparatus of claim 7, wherein the instructions to adapt the respective priority associated with each data flow of the at least one data flow are executable by the one or more processors to cause the apparatus to:

adapt a first priority of the first data flow to be higher than a second priority of the second data flow based at least in part on a first deadline metric associated with the first data flow being higher than a second deadline metric associated with the second data flow, wherein prioritizing the first data flow over the second data flow is based at least in part on the first priority of the first data flow being higher than the second priority of the second data flow.

9. The apparatus of claim 1, wherein the instructions are further executable by the one or more processors to cause the apparatus to:

receive signaling indicating the respective set of one or more channel prioritization parameters associated with each data flow of the plurality of data flows.

10. The apparatus of claim 9, wherein the respective set of one or more channel prioritization parameters associated with each data flow of the plurality of data flows comprises one or more scaling parameters associated with one or more quality of service parameters, including at least a first scaling parameter associated with packet delay budget and a second scaling parameter associated with throughput.

11. The apparatus of claim 1, wherein the instructions are further executable by the one or more processors to cause the apparatus to:

receive signaling indicating a respective plurality of candidate sets of one or more channel prioritization parameters associated with each data flow of the plurality of data flows, wherein adapting the respective set of one or more channel prioritization parameters associated with the at least one data flow of the plurality of data flows comprises selecting the respective set of one or more channel prioritization parameters from the respective plurality of candidate sets of one or more channel prioritization parameters.

12. The apparatus of claim 1, wherein the instructions are further executable by the one or more processors to cause the apparatus to:

transmit an indication of each adapted set of one or more channel prioritization parameters associated with the at least one data flow of the plurality of data flows.

13. The apparatus of claim 1, wherein the respective set of one or more channel prioritization parameters comprises a priority, a prioritized bit rate, a bucket size duration, or any combination thereof.

14. The apparatus of claim 1, wherein the instructions are further executable by the one or more processors to cause the apparatus to:

receive an indication of a respective packet error rate associated with each data flow of the plurality of data flows, wherein calculating the respective deadline metric associated with the respective transmission time of each data flow is based at least in part on the respective packet error rate.

15. An apparatus for wireless communications at a network entity, comprising:

one or more processors;

one or more memories coupled with the one or more processors; and instructions stored in the one or more memories and executable by the one or more processors to cause the apparatus to:

transmit, to a user equipment (UE), signaling scheduling a plurality of data flows associated with a set of channels, wherein each data flow of the plurality of data flows is associated with a respective set of one or more channel prioritization parameters; and receive, from the UE, an indication of an adapted set of one or more channel prioritization parameters associated with a first data flow of the plurality of data flows, wherein the first data flow is prioritized over a second data flow of the plurality of data flow based on the adapted set of one or more channel prioritization parameters, and wherein the adapted set of one or more channel prioritization parameters is based at least in part on a first deadline metric for the first data flow, the first deadline metric associated with a transmission time of the first data flow, based at least in part on a first set of one or more channel prioritization parameters of the first data flow, and based at least in part on a respective packet delay budget of the first data flow, a respective throughput of the first data flow, and a respective quantity of bits of the first data flow.

16. The apparatus of claim 15, wherein the instructions are further executable by the one or more processors to cause the apparatus to:

transmit signaling indicating the respective set of one or more channel prioritization parameters associated with each data flow of the plurality of data flows for triggering a user equipment (UE) to adapt the respective set of one or more channel prioritization parameters associated with each data flow of the plurality of data flows based at least in part on a respective deadline metric associated each data flow.

17. The apparatus of claim 16, wherein the respective set of one or more channel prioritization parameters associated with each data flow of the plurality of data flows comprises one or more scaling parameters associated with one or more quality of service parameters, including at least a first scaling parameter associated with packet delay budget and a second scaling parameter associated with throughput.

18. The apparatus of claim 15, wherein the instructions are further executable by the one or more processors to cause the apparatus to:

transmit signaling indicating a respective plurality of candidate sets of one or more channel prioritization parameters associated with each data flow of the plurality of data flows, wherein a first plurality of candidate sets of channel prioritization parameters associated with the first data flow of the plurality of data flows comprises the adapted set of one or more channel prioritization parameters associated with the first data flow of the plurality of data flows.

19. The apparatus of claim 15, wherein the respective set of one or more channel prioritization parameters comprises a priority, a prioritized bit rate, a bucket size duration, or any combination thereof.

20. The apparatus of claim 16, wherein the instructions are further executable by the one or more processors to cause the apparatus to:

transmit an indication of a respective packet error rate associated with each data flow of the plurality of data flows, wherein the first deadline metric associated with first data flow is based at least in part on the respective packet error rate.

21. A method for wireless communications at a user equipment (UE), comprising:

receiving, from a network entity, signaling scheduling a plurality of data flows associated with a set of channels, wherein each data flow of the plurality of data flows is associated with a respective set of one or more channel prioritization parameters;

calculating a respective deadline metric for each data flow of the plurality of data flows based at least in part on a respective packet delay budget of a corresponding data flow, a respective throughput of the corresponding data flow, and a respective quantity of bits of the corresponding data flow, each deadline metric associated with a respective transmission time of the corresponding data flow and calculated based at least in part on the respective set of one or more channel prioritization parameters of the corresponding data flow;

adapting the respective set of one or more channel prioritization parameters associated with at least one data flow of the plurality of data flows based at least in part on the respective deadline metric of the at least one data flow; and transmitting, to the network entity, a first data flow of the plurality of data flows based at least in part on a prioritization of the first data flow over a second data flow of the plurality of data flows, wherein the prioritization is based at least in part on the adapting.

22. The method of claim 21, wherein calculating the respective deadline metric for each data flow comprises:

calculating a first deadline metric for the first data flow based at least in part on a first packet delay budget, a first throughput, a first payload size, a first quantity of bits, or any combination thereof, of the first data flow.

23. The method of claim 22, wherein calculating the respective deadline metric for each data flow comprises:

calculating a time duration to flush a buffer associated with the first data flow based at least in part on the first throughput and the first quantity of bits, wherein the first deadline metric is based at least in part on the time duration to flush the buffer.

24. The method of claim 22, wherein calculating the respective deadline metric for each data flow comprises:

calculating the first deadline metric based at least in part on a first scaling parameter associated with the first packet delay budget, the first packet delay budget, a second scaling parameter associated with the first throughput, and the first throughput.

25. The method of claim 21, wherein adapting the respective set of one or more channel prioritization parameters associated with each data flow of the at least one data flow of the plurality of data flows comprises:

adapting a respective priority associated with each of the at least one data flow of the plurality of data flows based at least in part on the respective deadline metric associated with each of the at least one data flow, wherein the respective set of one or more channel prioritization parameters comprises the respective priority.

26. The method of claim 25, wherein adapting the respective priority associated with each data flow of the at least one data flow of the plurality of data flows comprises:

adapting a first priority of the first data flow to be higher than a second priority of the second data flow based at least in part on a first deadline metric associated with the first data flow being higher than a second deadline metric associated with the second data flow, wherein prioritizing the first data flow over the second data flow is based at least in part on the first priority of the first data flow being higher than the second priority of the second data flow.

27. The method of claim 21, further comprising:

receiving signaling indicating the respective set of one or more channel prioritization parameters associated with each data flow of the plurality of data flows.

28. The method of claim 21, further comprising:

receiving signaling indicating a plurality of candidate sets of one or more channel prioritization parameters associated with each data flow of the plurality of data flows, wherein adapting the respective set of one or more channel prioritization parameters associated with the at least one data flow of the plurality of data flows comprises selecting the respective set of one or more channel prioritization parameters from the plurality of candidate sets of one or more channel prioritization parameters.

29. The method of claim 21, further comprising:

transmitting an indication of each adapted set of one or more channel prioritization parameters associated with the at least one data flow of the plurality of data flows.

30. A method for wireless communications at a network entity, comprising:

transmitting, to a user equipment (UE), signaling scheduling a plurality of data flows associated with a respective set of channels, wherein each data flow of the plurality of data flows is associated with a set of one or more channel prioritization parameters; and receiving, from the UE, an indication of an adapted set of one or more channel prioritization parameters associated with a first data flow of the plurality of data flows, wherein the first data flow is prioritized over a second data flow of the plurality of data flow based on the adapted set of one or more channel prioritization parameters, and wherein the adapted set of one or more channel prioritization parameters is based at least in part on a first deadline metric for the first data flow, the first deadline metric associated with a transmission time of the first data flow, based at least in part on a first set of one or more channel prioritization parameters of the first data flow, and based at least in part on a respective packet delay budget of the first data flow, a respective throughput of the first data flow, and a respective quantity of bits of the first data flow.

* * * * *